United States Patent [19]

Stimac et al.

[11] Patent Number: 4,926,322

[45] Date of Patent: May 15, 1990

[54] SOFTWARE EMULATION OF BANK-SWITCHED MEMORY USING A VIRTUAL DOS MONITOR AND PAGED MEMORY MANAGEMENT

[75] Inventors: Gary A. Stimac; William C. Crosswy, both of Houston; Stephen B. Preston, Spring; James S. Flannigan, Cypress, all of Tex.

[73] Assignee: Compaq Computer Corporation, Houston, Tex.

[21] Appl. No.: 81,325

[22] Filed: Aug. 3, 1987

[51] Int. Cl.$^5$ .................. G06F 9/00; G06F 13/00; G06F 11/30
[52] U.S. Cl. .................................................. 364/200
[58] Field of Search ... 364/200 MS File, 900 MS File, 364/300

[56] References Cited

U.S. PATENT DOCUMENTS

| 4,279,014 | 7/1987 | Cassonnet et al. | 364/200 |
| 4,285,039 | 8/1981 | Patterson et al. | 364/200 |
| 4,285,040 | 8/1981 | Carlson et al. | 364/200 |
| 4,403,283 | 9/1983 | Myntii et al. | 364/200 |
| 4,439,762 | 3/1984 | Van Vliet et al. | 340/799 |
| 4,449,181 | 5/1984 | Young et al. | 364/200 |
| 4,449,184 | 5/1984 | Pohlman, II et al. | 364/200 |
| 4,481,570 | 11/1984 | Wiker | 364/200 |
| 4,503,491 | 3/1985 | Lushtak et al. | 364/200 |
| 4,520,453 | 5/1985 | Chow | 364/900 |
| 4,545,010 | 10/1985 | Salas et al. | 364/200 |
| 4,601,018 | 7/1986 | Baum et al. | 365/189 |
| 4,609,996 | 9/1986 | Kummer | 364/900 |
| 4,615,006 | 9/1986 | Hirano | 364/200 |
| 4,707,803 | 11/1987 | Anthony, Jr. et al. | 364/900 |
| 4,723,205 | 2/1988 | Fukuda et al. | 364/200 |
| 4,727,480 | 2/1988 | Albright et al. | 364/200 |
| 4,727,485 | 2/1988 | Keslear et al. | 364/200 |
| 4,742,450 | 5/1988 | Duvall et al. | 364/200 |
| 4,744,048 | 5/1988 | Blanset et al. | 364/900 |
| 4,747,040 | 5/1988 | Blanset et al. | 364/200 |
| 4,777,589 | 10/1988 | Boettner et al. | 364/200 |
| 4,779,187 | 10/1988 | Letwin | 364/200 |
| 4,831,522 | 5/1989 | Henderson et al. | 364/200 |
| 4,849,875 | 7/1989 | Fairman et al. | 364/200 |

OTHER PUBLICATIONS

Randall L. Hyde, "Overview of Memory Management", Byte Apr. 88, pp. 219–225.
Carl Hensler & Ken Sarno, "Marrying Unix and the 80836", Byte Apr. 88, pp. 237–244.

Primary Examiner—Andrew J. James
Assistant Examiner—Viet Q. Nguyen
Attorney, Agent, or Firm—Arnold, White & Durkee

[57] ABSTRACT

A virtual DOS monitor uses the paging hardware of a processor such as the Intel 80386 microprocessor in conjunction with its Virtual-8086 mode of operation to emulate expanded memory using extended memory. Support for application programs which access expanded memory is thereby provided without the need for additional memory boards or other hardware.

31 Claims, 9 Drawing Sheets

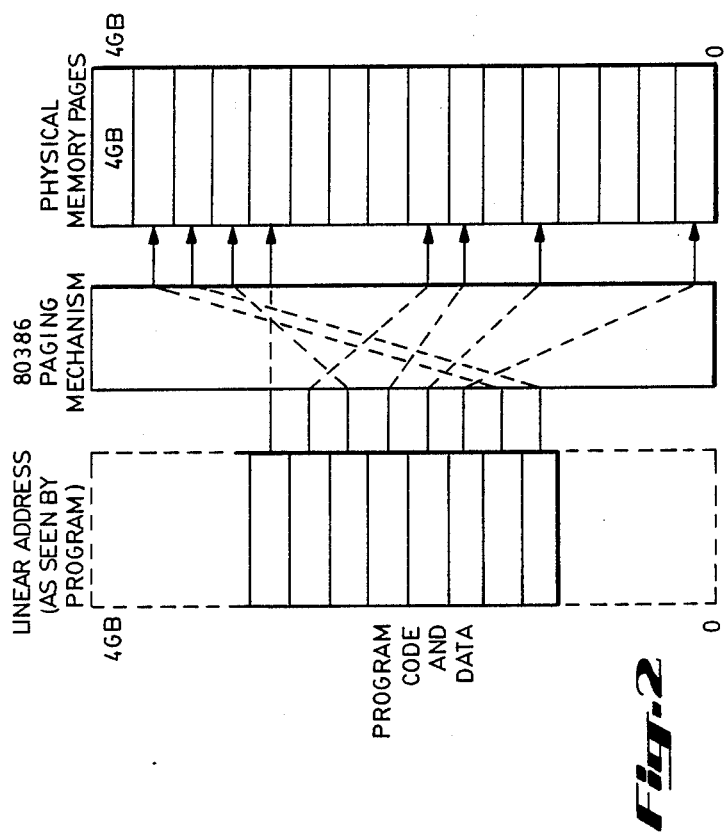

| | | |
|---|---|---|
| 0-BLOCK | 1st 64K | ORDINARY USER MEMORY TO 64K |
| 1-BLOCK | 2nd 64K | ORDINARY USER MEMORY TO 128K |
| 2-BLOCK | 3rd 64K | ORDINARY USER MEMORY TO 192K |
| 3-BLOCK | 4th 64K | ORDINARY USER MEMORY TO 256K |
| 4-BLOCK | 5th 64K | ORDINARY USER MEMORY TO 320K |
| 5-BLOCK | 6th 64K | ORDINARY USER MEMORY TO 384K |
| 6-BLOCK | 7th 64K | ORDINARY USER MEMORY TO 448K |
| 7-BLOCK | 8th 64K | ORDINARY USER MEMORY TO 512K |
| 8-BLOCK | 9th 64K | ORDINARY USER MEMORY TO 576K |
| 9-BLOCK | 10th 64K | ORDINARY USER MEMORY TO 640K |
| A-BLOCK | 11th 64K | EXTENDED VIDEO MEMORY |
| B-BLOCK | 12th 64K | STANDARD VIDEO MEMORY |
| C-BLOCK | 13th 64K | ROM EXPANSION (XT, EGA, 3270 PC) |
| D-BLOCK | 14th 64K | OTHER USE (PCjr CARTRIDGES) |
| E-BLOCK | 15th 64K | OTHER USE (PCjr CARTRIDGES) |
| F-BLOCK | 16th 64K | SYSTEM ROM-BIOS AND ROM-BASIC |

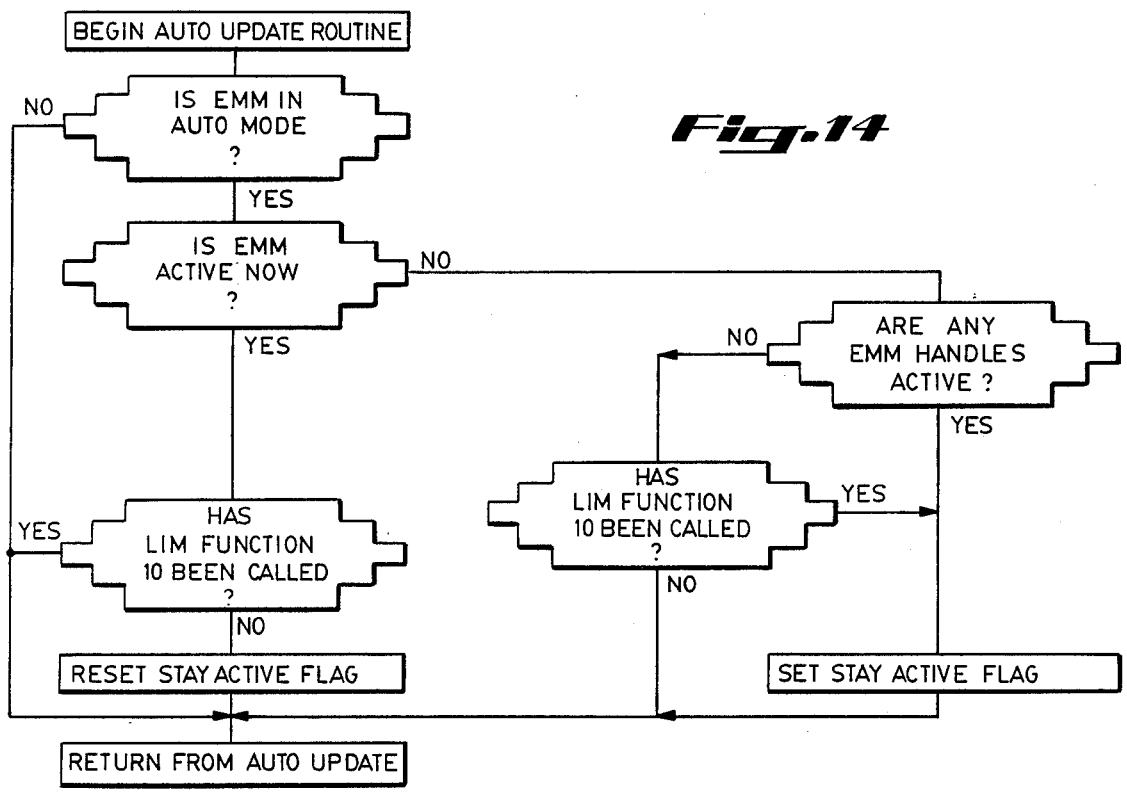
Fig. 14
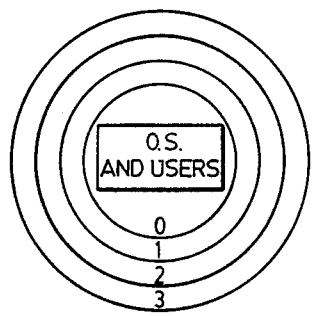
A. UNPROTECTED SYSTEM
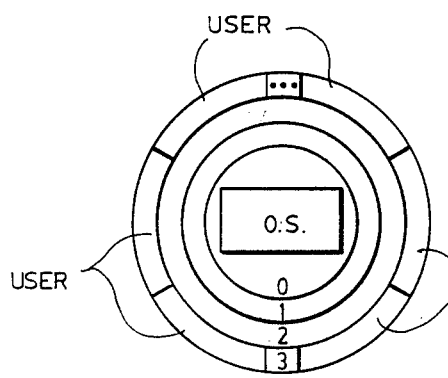
B. SUPERVISOR/USER PROTECTION
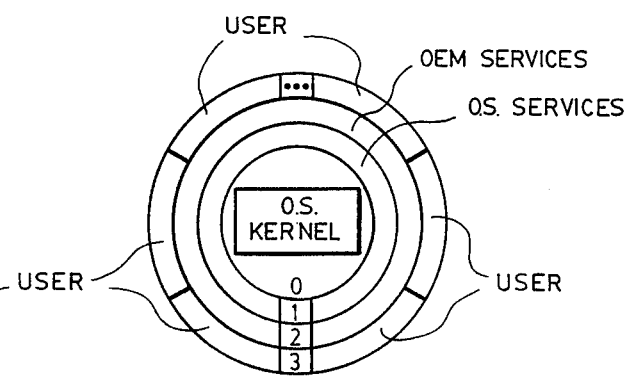
C. FOUR LEVELS OF PROTECTION
Fig. 7

REAL MODE STACK

| | |
|---|---|
| REAL MODE FLAGS BEFORE INTERRUPT | +4 |
| REAL MODE CS BEFORE INTERRUPT | +2 |
| REAL MODE IP BEFORE INTERRUPT | +0 |

← REAL MODE SS:SP POINTED TO HERE BEFORE THE INTERRUPT.

← REAL MODE SS:SP AT BEGIN OF INTERRUPT HANDLER EXECUTION.

Fig.8

PROTECTED MODE STACK

| HIWORD | LOWORD | OFFSET |
|---|---|---|
| ???? | VIRTUAL MODE GS | +32 (DECIMAL) |
| ???? | VIRTUAL MODE FS | +28 |
| ???? | VIRTUAL MODE DS | +24 |
| ???? | VIRTUAL MODE ES | +20 |
| ???? | VIRTUAL MODE SS | +16 |
| VIRTUAL MODE ESP | | +12 |
| VIRTUAL MODE EFLAGS | | +08 |
| ???? | CS OF VIRTUAL MODE TASK INTERRUPTED | +04 |
| EIP OF VIRTUAL MODE TASK INTERRUPTED | | +00 |

← TOP OF RING 0 STACK

← PROTECTED MODE SS:ESP POINTS AT BEGIN OF INTERRUPT HANDLER EXECUTION.

Fig.9

PROTECTED MODE STACK (RING 0 STACK)

| HIWORD | LOWORD | OFFSET |
|---|---|---|
| ???? | VIRTUAL MODE GS | +32 (DECIMAL) |
| ???? | VIRTUAL MODE FS | +28 |
| ???? | VIRTUAL MODE DS | +24 |
| ???? | VIRTUAL MODE ES | +20 |
| ???? | VIRTUAL MODE SS | +16 |
| NEW VIRTUAL MODE ESP (OLD ESP-6) | | +12 |
| EFLAGS (IF AND TF CLEARED) | | +08 |
| ???? | CS OF VIRTUAL MODE INTERRUPT HANDLER | +04 |
| EIP OF VIRTUAL MODE INTERRUPT HANDLER | | +00 |

← PROTECTED MODE SS:ESP POINTS TO HERE.

VIRTUAL MODE STACK

| VIRTUAL MODE FLAGS BEFORE INTERRUPT | +4 |
|---|---|
| VIRTUAL MODE CS BEFORE INTERRUPT | +2 |
| VIRTUAL MODE IP BEFORE INTERRUPT | +0 |

← VIRTUAL MODE SS:ESP POINTED TO HERE BEFORE INTERRUPT.

← VIRTUAL MODE SS:ESP IN RING 0 STACK POINTS TO HERE.

Fig.10

SOFTWARE EMULATION OF BANK-SWITCHED MEMORY USING A VIRTUAL DOS MONITOR AND PAGED MEMORY MANAGEMENT

BACKGROUND OF THE INVENTION

1. Field of the Invention

This invention relates to computer memory management. More particularly, it relates to application program access to expanded memory via the Lotus/Intel/Microsoft Expanded Memory Specification on computers having extended memory and memory paging capabilities.

2. Description of the Related Art

Many popular personal computers (PC's) are based on Intel microprocessors (Intel Corporation, 3065 Bowers Ave. Santa Clara, Calif. 95051). These include the model 8080, introduced in 1974, the 8088 which is used in the Compaq Portable and the IBM-PC, the 8086 used in the Compaq Deskpro, the 80286 used in both the Compaq Deskpro 286 and the IBM-PC AT, and the 80386 processor of the Compaq Deskpro 386. These microprocessors have been designed for upward compatibility—programs written for the 8088 and/or the 8086 can be run on computers having 80286 or 80386 processors and programs written for the 80286 processor can be run by the 80386.

The amount of physical memory a microprocessor can access depends on the number of address lines that emanate from the chip. Each additional bit doubles the amount of addressable memory.

The Intel 8080 microprocessor has 16 address lines and can therefore access 65536 ($2^{16}$) memory locations. By convention, microcomputer memory consists of 8-bit bytes. Thus, the 8080 can access 64 kilobytes (64KB) of memory. On the machine-code level, a program accesses memory with addresses that are stored as values in the internal registers of the microprocessor. Although the 8080 is an 8-bit microprocessor, the instruction pointer (a register used to address machine code) is 16 bits wide. For addressing data, the 8080 employs two 8-bit registers used in conjunction. The resultant 16-bit value directly addresses a location in the 64KB memory space.

As noted above, the Intel 8086 and the 8088 were designed to be upwardly compatible with the 8080 on a source-code level. (Although 8080 machine code itself cannot be executed by an 8086, an 8080 assembly language program can be converted into equivalent 8086 machine code.) Yet, the 8086 and 8088 can address one megabyte of memory, which requires a 20-bit address. For the purposes of this disclosure, the 8088 and the 8086 may be considered functionally equivalent and will henceforth be referred to as "the 8086." Unless explicitly stated otherwise, references to "the 8086" may be taken as applying equally well to the 8088 microprocessor.

Rather than introduce a 20-bit register into the 8086, the 20-bit address is split into two pieces—a 16-bit segment address and a 16-bit offset address. These two pieces are stored in different registers. The microprocessor shifts the segment address 4 bits left (thereby effectively multiplying it by 16) and then adds the offset address. The result is a 20-bit address that can access 1 megabyte of memory. It should be appreciated that various combinations of segment and offset can produce the same physical address.

By convention, a 20-bit address can be shown broken down into its segment and offset parts using the notation 0000:0000, the segment being to the left of the colon and the offset on the right. For example, a 20-bit address written as FFE6E in hexadecimal notation could be written as FFE4:002E in segmented notation. Depending upon which segment (or "segment paragraph") is chosen, a single 20-bit address can be expressed in a variety of ways using segmented notation. For example, the physical address 00030 can be accessed by all the following segments and offsets (segment paragraphs and relative offsets): 0000:0030; 0001:0020; 0002:0010; and, 0003:0000.

Each of the four segment registers in the 8086 defines a 64KB block of memory called a "segment." If all the segment registers are kept constant and equal, then the microprocessor can access only 64KB of memory, just like the 8080.

The 80286 and 80386 microprocessors both support and go beyond the segmented addressing scheme of the 8086. When first powered up, they operate in "real mode," which uses segment and offset registers in the same way as the 8086 to access the same one megabyte of memory. Thus the 80286 and 80386 microprocessors are upwardly compatible with the addressing scheme of the 8086 chip.

In addition to real mode operation, the 80286 and 80386 can operate in "protected mode." The difference with protected mode is that the segment register is no longer a real (i.e., physical) address. Instead, the 80286 microprocessor used the upper (most significant) 14 bits of the segment register to look up a 24-bit base address stored in a descriptor table also in memory. The 80286 adds the 16-bit offset address to this base address. The 24 bits allow access to 16 megabytes of memory ($2^{24}$) instead of 1 megabyte ($2^{20}$).

The on-chip memory management and multitasking abilities of the 80286 and 80386 are also part of protected mode. With protected mode, segment registers define the way that memory is organized between tasks. Each task has its own descriptor table describing the segments for that task, and that (along with the registers) is virtually all that the chip needs to store to switch between tasks. Since physical addresses are stored in the descriptor table rather than in the segment registers, the operating system can move memory around without application programs being affected.

Protected mode is so named because segments belonging to one task are protected from being corrupted by another task. Tasks are organized in privilege levels, and certain machine-code instructions are prohibited to lower privilege levels. In a well-designed protected-mode operating system, a single program can neither crash the whole system nor get itself into an unrecoverable state.

On the 80386 the base address associated with each segment is not limited to 24 bits, as in the 80286. Rather, it is 32 bits wide and thus can be anywhere within the 4 gigabytes ($2^{32}$) of addressable memory. If the top 8 bits (eight most significant bits) of the base addresses are set to zero, then the 80386 addressing scheme works just like that of the 80286.

The offset addresses of the 80386 in protected mode are expanded from 16 bits to 32 bits. This overcomes the 64KB segment limit of the 80286 protected mode and allows a 4-gigabyte maximum segment size.

In addition to real mode and protected mode, the 80386 has an additional mode of operation known as virtual 8086 mode which permits the processor to imitate multiple 8086- or 8088-based machines while it is also running in protected mode. As the name implies, the 80386 can mimic a 1-megabyte addressing environment that to existing programs appears to be an 8086. But unlike real mode, more than 1 megabyte is available. The 80386 can actually maintain more than one virtual 8086 environment in memory at the same time. Each of these environments can have its own copy of the operating system and an application program. At the same time, a protected mode operating system and application can be using a different area of memory.

In virtual 8086 mode, the 80386 treats the segment registers the same way as in real mode, where they represent real (i.e., physical) addresses. Thus, existing DOS programs (and DOS itself) can operate in the conventional manner with segment registers and not run into the problems associated with protected mode.

The addresses from multiple virtual 8086 sessions do not collide when they access physical memory because when the 80386 adds the segment and offset registers together, it creates not a physical address, but a linear address. A set of paging tables translates the linear address into a physical address. This physical address may be anywhere in the 4 gigabytes of the 80386 addressable memory.

The paging hardware of the 80386 (described infra and which is not limited to virtual 8086 mode) works with 4K-byte blocks of memory. The pages can be set up so that some memory (for instance, a single ROM BIOS) is used by several virtual 8086 sessions. Virtual 8086 mode solves the problem of allowing programs that write directly to the display memory to be multitasked. The address of the display can be mapped to another location in memory and transferred to the real display during program switching. Alternatively, the operating system can combine display output from several virtual 8086 sessions into a single-windowed real display.

All interrupts and all I/O port accesses initiated by programs in virtual 8086 mode can be trapped by the operating system that has set up these virtual 8086 environments. To correctly handle these I/O port accesses, this operating system would have to have complete knowledge of all hardware that may be directly accessed by more than one virtual 8086 session.

The entire 1 megabyte address space of the 8086 can be thought of as divided into 16 blocks of 64K each. Each of these blocks of memory can be identified by the high-order (most significant) hex digit that all addresses in that block share. Thus, the first 64K of memory can be called the 0 block, since all addresses in that block are 0xxxx (in five-digit absolute address notation) or 0xxx:xxxx (in segmented address notation). Likewise, the second block is the 1-block, since all addresses in that 64K begin with 1. In the 1 megabyte address space, there are 16 blocks of 64K, which may be designated the 0-block through the F-block (in hexadecimal notation).

Many 8086-based personal computers such as the Compaq Portable or the IBM-PC use MS-DOS ("DOS"; Microsoft Corporation, 107000 Northup Way, Bellevue, Wash. 98009) as the operating system. The key working area of their memory is that part used for programs and their data—the area made up of the first ten blocks, the 0-through 9-blocks. This area is often called the user memory area to distinguish it from the rest of the address space, which is, one way or another, at the service of the computer system itself. Thus, the maximum amount of user memory is 640K (all ten blocks installed).

Immediately following the user memory area is a 128K area, consisting of the A- and B-blocks, that is set aside for use by the display screens. The memory that is installed for use by the display screens operates in the same fashion as conventional read/write Random Access Memory ("RAM") used for user memory. Normally, it has one extra feature which helps speed the operation of the computer: there are two circuit pathways into it, so that both programs (being run by the microprocessor) and the display screen can simultaneously work with it, without interfering with each other.

After the display memory area comes three blocks, C through E, which are commonly set aside for some special uses. These blocks are called the "ROM extension area." One use, which gives this section its name, is as a growth area for the last section of memory, the ROM-BIOS which occupies the final F-block. Another use for the ROM extension area is for removable software cartridges. A third use for the ROM extension area is to support "extended memory" discussed infra.

The final part of the 8086 memory address space is the F-block, which is used to hold the computer's built-in ROM-BIOS programs. The ROM-BIOS holds a key set of programs that provide essential support for the whole operation of the computer. These include the power-on self-test and the basic input/output service routines.

FIG. 1 depicts the above-described allocation of memory blocks for an 8086-based computer.

The portion of memory above 1 megabyte which can be addressed by the 80286 and 80386 microprocessors (100000h through FFFFFFh and 100000h through FFFFFFFFh, respectively) is referred to as extended memory. Thus, extended memory is the 15M-byte address space on an 80286 based computer which lies outside the memory DOS can access. This address space is of little use to those application programs that use DOS since DOS does not recognize memory above 640K. The XENIX operating system manages extended memory. Extended memory is sometimes called expansion memory (not to be confused with expanded memory). This is physical memory which is addressed beginning at 1 megabyte and is normally accessed only by protected mode programs.

To take full advantage of extended memory or virtual memory one must have an operating system environment (and accompanying programs) that is designed for those features. Since the 8086 and its mainstream operating system, MS-DOS, were not developed with extended and virtual memory in mind, the potential of these features remains largely untapped.

However, it is still possible for a program to make some use of extended memory. One way to do this is for a program to use some of the services provided by the computer's built-in ROM-BIOS programs. One of these services transfers blocks of data, in whatever size is needed, between the extended memory and conventional memory. An example of a program that uses the BIOS's transfer service to use extended memory is the virtual disk utility called VDISK which has been a part of DOS since version 3.0. When VDISK is activated with the extended memory, it uses the BIOS transfer service to move data into and out of extended memory without VDISK needing to work in protected mode or directly manipulate the extended memory area.

As discussed above, an 8086-based computer is limited to only addressing one megabyte of storage, and only using 640K of that for working programs and data. For some applications, most notably large spreadsheets, this is too little memory. One solution to this problem is bank-switched memory.

Bank-switching allows the computer to actually have more memory than can be directly addressed in the microprocessor's 1MB memory address space. The memory is physically in the computer, but it is not actually assigned any particular place in the microprocessor's address space. Bank-switched memory is inaccessible to application programs until it is switched on.

The circuit boards for this special kind of bank-switched memory allow the addressing of the memory to be turned on and off at will, and moved around at will. For example, a bank-switched memory board might contain eight "banks" of memory, each of them 64K (for a total of 512K). All of these 64K blocks share a single 64K address block in the computer's memory. At any instant, only one of these eight banks can be active, with its data accessible, while the others will be on hold.

The benefit of bank-switching is that it allows more memory to be attached to the computer, memory that is instantly accessible. All that it takes to switch a bank into place is to send a command to the memory circuit board, telling it to change the addressing of the banks. The switch takes place as quickly as an instruction can execute.

Unlike the computer's conventional memory, bank-switched memory requires active management to make sure that the right pieces are available at the right times. As a result of the need for that management, Lotus Development Corporation, Intel Corporation, and Microsoft Corporation collaborated to define a standard way of working with bank-switched memory. This bank-switched approach is called the Lotus/Intel/Microsoft Expanded Memory Specification ("the LIM specification"). Version 3.20 of the LIM specification dated September, 1985, (Part Number 00275-003) is incorporated by reference into this disclosure.

Expanded memory operates in three parts: one piece of hardware (the bank-switched memory board), and two pieces of software (the expanded memory manager—known as the EMM—and the application program that uses the memory). The bank-switched memory board—which can be Intel's "Above Board," AST's "RAMpage!" or any similar memory board—provides anywhere from 64K up to 8 megabytes of memory, subdivided into small 16K pages that can be individually readdressed through bank-switching.

The EMM memory manager program is activated when the computer is first started up, and it lays the groundwork for the expanded memory's operation. A key part of its task is to find an unused area in the computer's memory space into which it can map the bank-switch memory. It requires a full 64K work area, called a page frame. As can be seen from the general memory allocation shown in FIG. 1, the D and E blocks of memory are obviously good candidates for the location of the page frame; however, the EMM can place the page frame in the C block as well. The exact location doesn't matter, as long as it doesn't interfere with any other use of the memory address space. Also, the 64K page frame doesn't have to be placed on a memory block boundary. For example, it can begin at the segment address C400 and extend up through the rest of the C block and into the first 16K of the D block.

Once the EMM has established where its 64K page frame will be located, it divides the frame into four 16K windows. After that, the EMM will supply any application program which adheres to the LIM specification with the service of swapping memory data in and out of the 16K windows.

To use the expanded memory, an application program tells the EMM that it needs to use one or more of the four available windows. The application can request the EMM supervisor to assign memory pages to it, and then to make those pages accessible by bank-switching them into the window area. As the application program needs to work with different 16K pages of data, it asks the EMM to switch different pages into place.

Expanded memory can be used only for a program's data, not for the program code itself. DOS still has to find sufficient room in the conventional memory area to hold large programs, but once those programs are running in conventional memory, they can take advantage of expanded memory to work with more data than can be accommodated in conventional memory. Conventional memory is the memory DOS recognizes; in 8086-, 8088- and 80286-based computers this is memory between 0 and 640K bytes. Because application programs let DOS manage their memory, they can use only conventional memory.

One drawback to expanded memory is that to use it a program must be written to work together with the expanded memory manager, EMM, and it must know how to conveniently work with its data fragmented into 16K pages. Despite this and other limitations, the expanded memory scheme can greatly enhance a computer's ability to work with large amounts of data.

The expanded memory scheme discussed above can be used with any 8086-compatible computer including those based on the 80286 and the 80386. While the 286 and 386 can have their own extended memory that goes beyond the 8086's 1MB limit, they can also use expanded memory within the conventional address space.

Unlike the 8086, 8088, and 80286, the 80386 microprocessor incorporates memory paging hardware. This allows linear addresses (as seen by programs) to be mapped to physical memory addresses. This facility allows the efficient implementation of virtual memory systems. With memory paging support, the operating system can easily allocate contiguous memory to an application simply by mapping a number of noncontiguous physical memory pages into the requested logical program space. This mapping of a program's linear address space into physical memory is shown schematically in FIG. 2.

The mapping of noncontiguous physical memory pages into a requested logical program space is performed by updating the page directory and page tables. An 80386 operating system enables paging by setting the PG (Paging Enabled) bit in Control Register 0 (CR0) with a privileged instruction. When paging is enabled, the processor translates a linear address to a physical address with the aid of page tables. Page tables are the counterparts of segment descriptor tables; as a task's segment descriptor table defines its logical address space, a task's page tables define its linear address space. An 80386's task's page tables are arranged in a two-level hierarchy as shown in FIG. 3. Each task can have its own page table directory. The 80386's CR3

(Page Table Directory Base) system register points to the running task's page table directory; the processor updates CR3 on each task switch, obtaining the new directory address from the new task's Task State Segment (TSS).

A page table directory is one page long and contains entries for up to 1024 page tables. Page tables are also one page long, and the entries in a page table describe 1024 pages. Thus, each page table maps 4 megabytes and a directory can map up to 4 gigabytes, the entire 32-bit physical address space of the 80386.

FIG. 3 shows in functional terms how the 80386 microprocessor translates a linear address to a physical address when paging is enabled. The processor uses the upper 10 bits of the linear address as an index into the directory. The selected directory entry contains the address of a page table. The processor adds the middle 10 bits of the linear address to the page table address to index the page table entry that describes the target page. Adding the lower 12 bits of the linear address to the page address produces the 32-bit physical address.

FIG. 4 shows the basic content of a page table entry. Directory entries are identical, except that the page address field is interpreted as the physical address of a page table, rather than a page.

Tasks can share individual pages or entire page tables. Entries in different page tables that point to the same page are aliases of one another just as descriptors with the same base address are aliases of one another. The 80386's two-level page table structure makes it easier to share pages between tasks by sharing entire page tables. Since the address of a page shared in this way exists in a single page table, the operating system has one page table entry to update when it moves the page.

Using the 80386 memory paging functions, a demand-page operating system can manage memory for multiple virtual-8086 mode machine simulations concurrently with protected mode applications. Memory paging also can be used to allow each 8086 machine simulation to have access to common routines and data, such as a system ROM, by making the physical ROM appear in the memory space of each simulated machine. Actually, only one ROM exists, but each machine sees it at the expected address within its 1MB address space.

FIG. 5 shows how the 80386 paging mechanism enables multiple virtual-8086 machines to be managed. A single copy of the 8086 operating system is made to appear in the address space of both machines. The paging mechanism gives each virtual-8086 task a 1MB linear address space. Read-only areas, such as the 8086 operating system, can reside on shared pages used by all virtual-8086 tasks. Unused pages can be omitted from physical memory.

Inasmuch as addressing is an important feature of the invention, there follows a discussion of the way in which the 80386 microprocessor addresses memory.

The physical address space of most computers is organized as a simple array of bytes. With the development of memory management units (MMU's), computer architectures began to distinguish between the physical address space implemented by the memory hardware and the logical address space seen by a programmer. The MMU translates the logical addresses presented by programs into the physical addresses that go out on the bus. Most architectures view a task's logical address space as consisting of a collection of one of the following:

Bytes: The logical address space consists of an array of bytes with no other structure (this is sometimes called a "flat" or "linear" address space). No MMU translation is required because a logical address is exactly equivalent to a physical address.

Segments: The logical address space consists of a few or many segments, each of which is composed of a variable number of bytes. A logical address is given in two parts, a segment number and an offset into the segment. The MMU translates a logical address into a physical address.

Pages: The logical address space consists of many pages, each of which is composed of a fixed number of bytes. A logical address is a page number plus an offset within the page. The MMU translates a logical address into a physical address.

Paged Segments: The logical address space consists of segments which themselves consist of pages. A logical address is a segment number and an offest. The MMU translates the logical address into a page number and an offset and then translates these into a physical address.

Technically, the 80386 views memory as a collection of segments that are optionally paged. In practice, the 80386 architecture supports operating systems that use any of the four views of memory described above.

FIG. 6 shows the fundamentals of 80386 logical-to-physical address translation. The sequence of operations shown in FIG. 6 is central to both addressing and protection.

The 80386 memory addressing modes yield the 32-bit offset of the target operand. Combined with a segment selector, this offset forms a two-part logical address: the selector identifies the target segment and the offset locates the operand in the segment. In the vast majority of instructions, the selector is specified implicitly as the content of a segment register.

A selector is an index into a segment descriptor table; that is, it is a segment number. Each entry in a segment descriptor table contains the base address of a segment. The processor adds the offset to the segment's base address to produce a 32-bit linear address. If paging is not enabled, the processor considers the linear address to be the physical address and emits it on the address pins.

If paging is enabled, the 80386 translates the linear address into a physical address. It does this with the aid of page tables. A page table is conceptually similar to a descriptor table except that each page table entry contains the physical base address of a 4KB page.

An operating system can provide a task with a single flat address space, a flat address space that is paged, a segmented address space, or a segmented address space that is paged.

The segment is the unit the 80386 provides for defining a task's logical address space; that is, a task's logical address space consists of one or more segments. An instruction refers to a memory operand by a two-part logical address consisting of a segment selector and an offset into the segment. In principle, the 80386 translates the logical address to a linear address by using the selector to look up the segment's descriptor in a segment descriptor table. The descriptor contains the segment's base address in the linear address space; adding the offset produces the operand's linear address. In practice, the logical-to-linear address translation is optimized by implicit selectors and register-based descriptors. As a result, the descriptor table lookup only occurs for instructions that load new selectors into segment registers.

In the second phase of address transformation, the 80386 transforms a linear address into a physical address. This phase of address transformation implements the basic features needed for page-oriented virtual-memory systems and page-level protection.

The page translation step is optional. Page translation is in effect only when the PG bit of CR0 is set. This bit is typically set by the operating system during software initialization. The PG bit must be set if the operating system is to implement multiple virtual 8086 tasks, page-oriented protection, or page-oriented virtual memory.

The 80386 provides an array of protection mechanisms that operating systems can selectively employ to fit their needs. One form of protection is the separation of task address spaces by segment descriptor tables and page tables. This separation effectively prevents application tasks from interfering with each other's code and data. In addition to isolating tasks from each other, the 80386 provides facilities for protecting the operating system from application code, for protecting one part of the operating system from other parts, and for protecting a task from some of its own errors. All 80386 protection facilities are implemented on-chip.

Many of 80386 proteciton facilities are based on the notion of a privilege hierarchy. At any instant, a task's privilege is equal to the privilege level of the code segment it is executing. In each segment descriptor is a field that defines the privilege level of the associated segment. The field may take one of four values. Privilege level 0 is the most-privileged level and privilege level 3 is the least-privileged level.

FIG. 7 shows how the 80386 privilege levels can be used to establish different protection policies. An unprotected system can be implemented by simply placing all procedures in a segment (or segments) whose privilege level is 0. The traditional supervisor/user distinction can be implemented by placing user (application) code in a privilege level 3 segment and supervisor procedures in a segment whose privilege level is 0. An operating system can also use privilege levels 1 and 2, if desired. For example, the most critical and least-changing operating system procedures (sometimes called the operating system kernel) might be assigned privilege level 0. Privilege level 1 might be used for the services that are less critical and more frequently modified or extended, for example, device drivers. Level 2 might be reserved for use by original equipment manufacturers (OEM's). Such OEM's could then assign their code privilege level 2, leaving level 3 for the end users. In this way, the OEM software is protected from the end users; the operating system is protected from both the OEM and the end users; and, the operating system kernel is protected from all other software, including that part of the operating system that is subject to frequent change.

A task's privilege level determines what instructions it may execute and what subset of the segments and/or pages in its address space it may reference. The processor checks for consistency between a task's privilege level and the privilege level of the segment or page that is the target of an instruction. Any attempt by a task to use a more privileged segment or page makes the processor stop execution of the instruction and raise a general protection exception.

In addition to defining which segments and pages it can use, a task's privilege level defines the instructions it can execute. The 80386 has a number of instructions whose execution must be tightly controlled to prevent serious system disruption. All of the instructions that load new values into the system registers are examples of privileged instructions.

The descriptors in a task's Local Descriptor Table (LDT) and Global Descriptor Table (GDT) define the task's logical address space. The segments defined in these tables are theoretically addressable, because the descriptor tables provide the information necessary to compute a segment's address. However, an addressable segment may not be accessible to a particular operation because of the additional protection checks made by the 80386. The 80386 checks every segment reference (whether generated by the execution of an instruction or an instruction fetch) to verify that the reference is consistent with the protection attributes of the segment as described below.

Privilege: To access a segment, a program must be at least as privileged as the segment. For example, a program running at level 3 can only reference segments whose privilege level is also 3, while a program running at level 0 can access all segments in its logical address space.

Limit: A reference to a segment must fall within the segment's limit. Segment limits enable the processor to trap common programming errors such as stack overflow, bad pointers and array subscripts, and bad call and jump addresses. In cases where the operating system can determine that a reference outside the bounds of a segment is not an error (stack overflow is an example in some systems), the operating system can extend the segment (for example, by adding a page to it) and restart the instruction.

Type: Each descriptor contains a type field that the processor checks for consistency with the instruction it is executing. Ordinary segments have a type of code or data, enabling the processor to catch an attempt to overwrite code, for example, the segment types manipulated directly by applications are code and data. System descriptors are also typed so the processor can verify when it is switching tasks, for example, that the segment named in Jump TSS instruction is in fact a Task Stage Segment.

Rights: A segment descriptor can be marked with rights that restrict the operations permitted on the associated segment. Code segments can be marked executable or executable-and-readable. Data segments can be marked read-only or readable-and-writable.

All of the checks described above depend on the integrity of descriptors. If a task executing its application code could change a descriptor, the checks would guarantee nothing. For this reason, an operating system can restrict access to descriptor tables to privilege level 0 code.

Note that for sharing, different descriptors for the same segment (that is, aliases) may have different protection attributes, allowing, for example, one task to read and write a segment while another can only read it. Aliases also permit the operating system to override the protection system when necessary, for example, to move a code segment.

Systems that do not make extensive use of segments can instead protect pages. (Page protection can also be applied to sections of large segments.) Like a descriptor, a page table entry has a set of protection attributes; the 80386 checks every reference to the page for conformance to these attributes.

A page table entry can be marked with one of two privilege levels, user or supervisor. User level corresponds to privilege level 3 but supervisor pages can only be accessed by tasks running at privilege levels 0, 1, or 2. A user page can also be marked read-only or readable-and-writable.

The 80386 microprocessor checks the protection attributes of a page after verifying that an access is consistent with the segment attributes. Thus, page protection is a convenient way for an operating system to apply additional protection to portions of a segment. For example, an operating system can safely store task-related operating system data, such as page tables and file descriptors, in a task's data segment by making the containing pages supervisor pages.

SUMMARY OF THE INVENTION

Using the paging mechanism of the 80386 microprocessor in conjunction with its virtual-8086 mode of operation it is possible to emulate expanded memory with extended memory. The software which performs this emulation is hereinafter referred to as the Compaq Expanded Memory Manager ("CEMM").

CEMM extends the 640K memory limit of the 8086 architecture using the LIM specification for expanded memory. In so doing, CEMM provides expanded memory without additional memory boards or other hardware if extended memory is available.

As described above, the LIM specification defines a standard software interface which MS-DOS application programs may use to access expanded memory. Application programs access expanded memory via four 16K windows in the 8086 address space. These four windows are adjacent in the 8086 address space and form a 64K page frame. The beginning address of the page frame is configurable. Most commonly it is located in the address range above video memory. To use expanded memory, an application program requests the expanded memory manager software to "map" a 16K page of expanded memory into one of the four 16K windows of the page frame.

On the 8088, 8086, and 80286 standard machines, expanded memory requires a specialized memory board; however, by using the above-described features of the 80386 processor, CEMM provides expanded memory for computers having extended memory without adding any memory boards and implements additional expanded memory using standard 80286/80386 extended memory boards.

CEMM can coexist with extended memory RAM disk drives which use the MS-DOS VDISK method for allocating extended memory. The user, however, must ensure that enough extended memory exists to satisfy both the CEMM expanded memory request and the RAM disk extended memory request.

CEMM consists of an MS-DOS device driver and an MS-DOS utility program for enabling and disabling CEMM. CEMM uses the virtual 8086 mode of the 80386 processor. This mode is essentially a subset of protected mode. When the CEMM device driver is loaded by the operating system, MS-DOS, it places the 80386 microprocessor in virtual 8086 mode. This makes CEMM expanded memory available at MS-DOS boot time and allows other device drivers to load properly if they require expanded memory. With the utility program, a user can disable CEMM when it is not needed or when he or she wishes to run a program which uses the protected mode of the 80386. The utility program also allows the user to re-enable CEMM afterwards without rebooting the system.

BRIEF DESCRIPTION OF THE DRAWINGS

FIG. 1 is a table of blocks of memory used in a standard operating system;

FIG. 2 is a diagram of address translation in an 80386 microprocessor used in an embodiment of the invention;

FIG. 7 is a diagram of privilege levels in an 80386 microprocessor;

FIG. 8 is a diagram of the contents of a memory stack used in real mode interrupts in an 80386 microprocessor;

FIG. 9 is a diagram of a memory stack used in virtual mode interrupts in an 80386 microprocessor;

FIG. 10 is a diagram of a memory stack used in virtual mode interrupts in an 80386 microprocessor;

FIGS. 13, 14 and 15 are logic flow charts of expanded memory management programs according to one embodiment of the invention.

DETAILED DESCRIPTION

Figure 3:
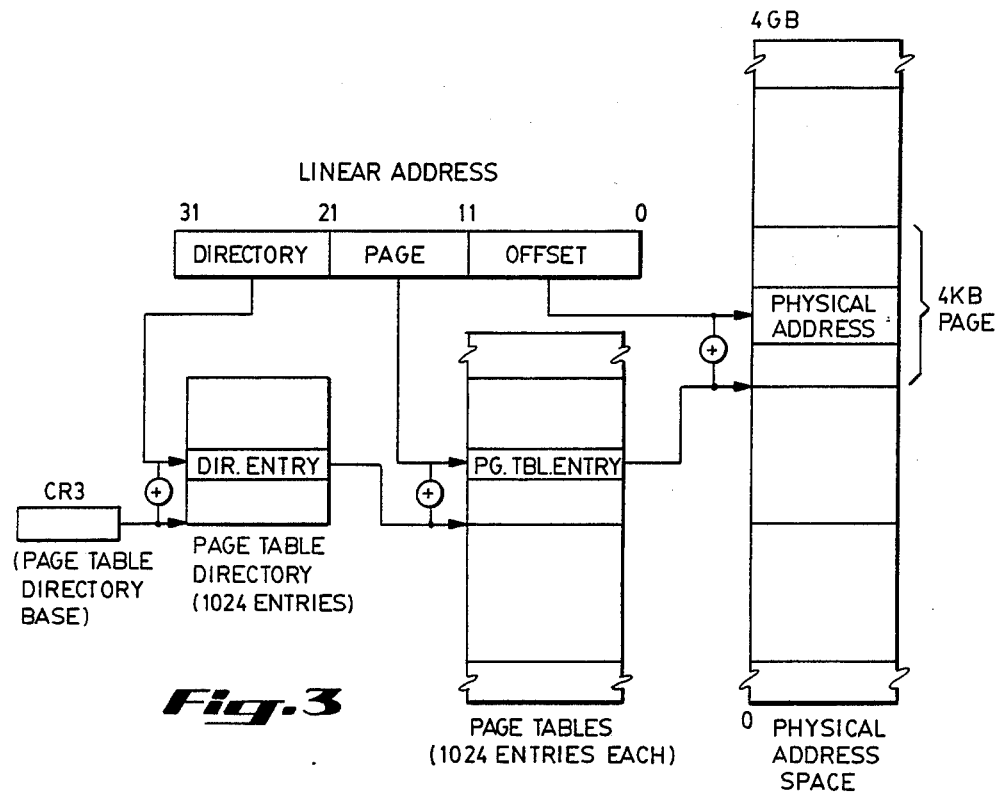
FIG. 3 is a diagram of address translation in an 80386 microprocessor used in an embodiment of the invention.
Figure 4:
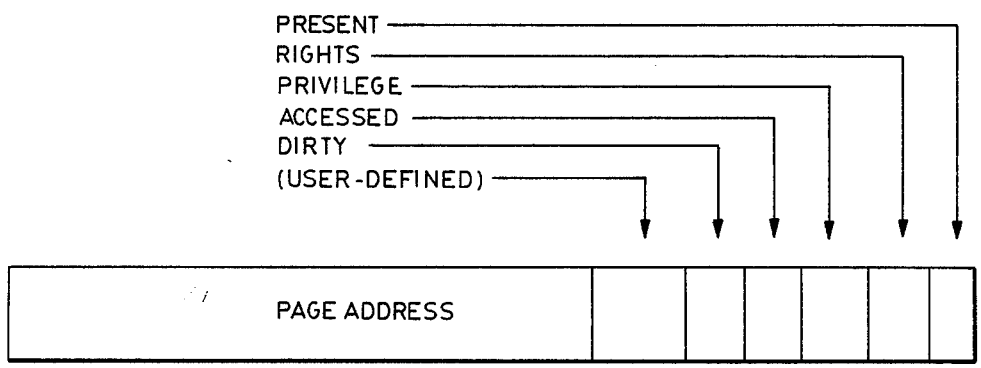
FIG. 4 is a diagram of the contents of a page table entry used in the address translation of FIG. 3.
Figure 5:
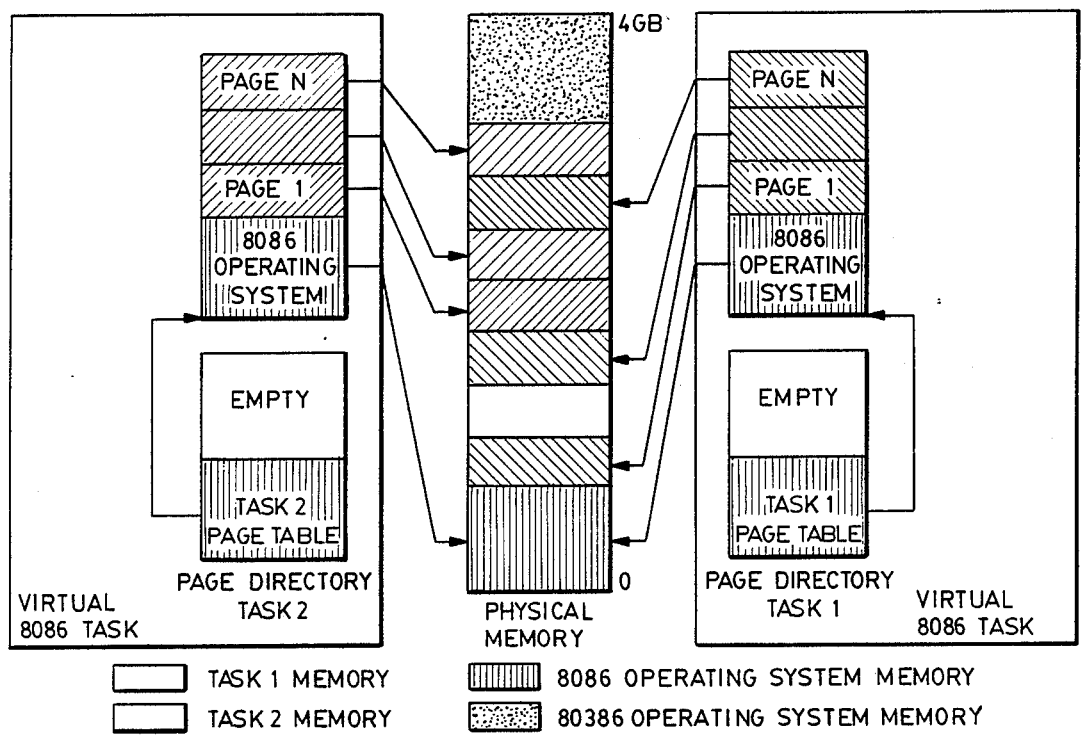
FIG. 5 is a diagram of the 80386 microprocessor paging mechanism as it is used to manage multiple virtual-8086 machines.
Figure 6:
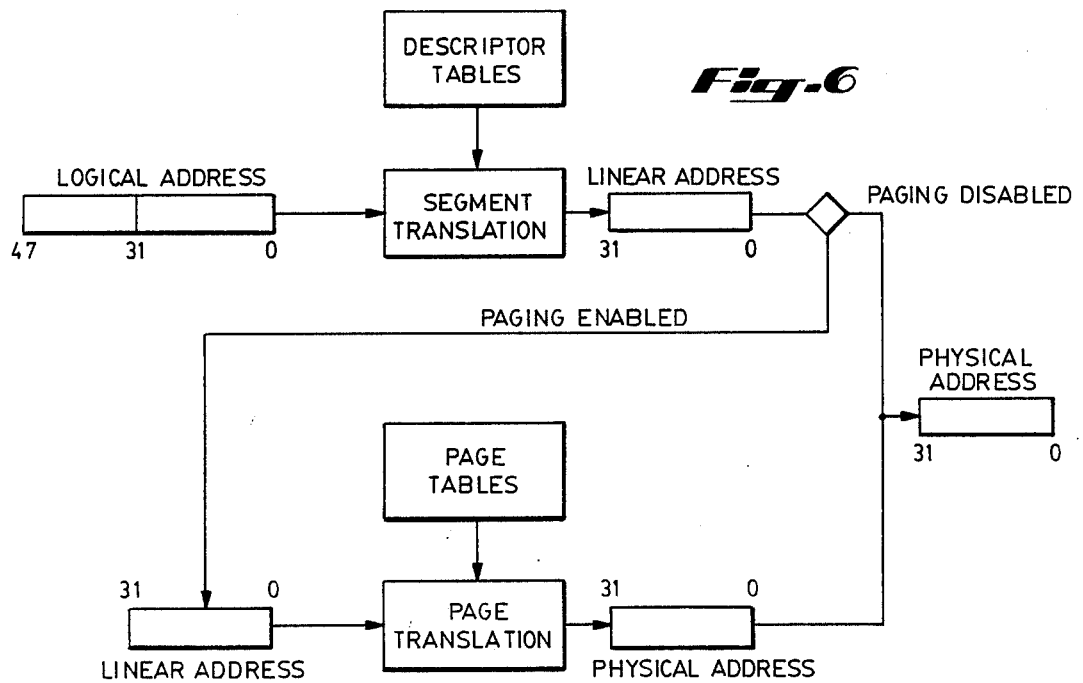
FIG. 6 is a diagram of logical-to-physical address translation in an 80386 microprocessor.

CEMM can be divided into three major functional parts; the Virtual DOS Monitor (VDM) code, the Expanded Memory Manager (EMM) code, and the initialization code with its MS-DOS device driver interface. The VDM part of CEMM manages the low level aspects of CEMM. In particular, the VDM manages hardware and software interrupts, I/O trapping, instruction emulation, and general system error handling. The VDM is similar in functionality to the kernel of a simple operating system. It is the VDM which allows a MS-DOS real mode program to execute within the Virtual 8086 mode of a processor which provides an 8086 execution environment. The upwardly compatible series of Intel processors 8088, 8086, 80186, 80286, 80386, and Intel processors which include the instruction set of these processors is hereinafter referred to as the Intel '86 family of microprocessors. The Virtual 8086 mode of an Intel '86 family microprocessor is hereinafter referred to as Virtual mode.

The EMM part of CEMM emulates Expanded Memory for MS-DOS programs running under CEMM. In particular, the EMM code provides the int 67h interface described by the LIM Expanded Memory Specification and the EMM code manipulates the system page tables to emulate the bank switching required for LIM expanded memory.

The initialization code sets up CEMM as a MS-DOS device driver, allocates memory for CEMM, and initializes the VDM and EMM data structures.

Virtual DOS Monitor (VDM)

The virtual DOS monitor (VDM) emulates an Intel '86 family microprocessor based computer running the wellknown MS-DOS operating system in real mode.

(MS-DOS is a trademark of Microsoft Corporation of Bellevue, Wash.) The emulation is accomplished using the virtual 8086 mode of an Intel '86 family microprocessor such as a 80386.

The VDM executes in the protected mode of the microprocessor. Its principal functions are: hardware and software interrupt reflection; input/output (I/O) instruction trapping; emulation of privileged instructions; provision of a communication interface between virtual-mode tasks running under the VDM and the VDM itself; and handling of system protection violations and error conditions. The VDM may also be designed to emulate the architectural features of a computer which is compatible with the "industry standard" 80286 computer architecture, as reflected, for example, in the COMPAQ DESKPRO 286.

Interrupt Reflection

The VDM employs a technique referred to herein as "interrupt reflection" to simulate the action of a real-mode software or hardware interrupt for a task which is running in the virtual mode of the processor. VDM uses interrupt reflection to cause the result of a hardware or software interrupt, generated in connection with a virtual-mode task, to be the same as with a real-mode task. Reference is made to the Intel publications cited above.

Through interrupt reflection, virtual-mode tasks can operate substantially identically to real mode. This permits the proper operation of the system ROM interrupt handlers, of real-mode operating system interrupt handlers (e.g., those associated with MS-DOS), and real-mode applications which trap interrupts.

On the 386 CPU, hardware interrupt reflection exemplifies the general technique of interrupt reflection; the next few paragraphs will concentrate on a description of the VDM's hardware interrupt reflection. The VDM's software interrupt reflection differs slightly from its hardware interrupt reflection and will be described hereafter.

In understanding interrupt reflection, it is useful to examine the difference between the effects of interrupts in virtual mode and in real mode. In real mode on the 386 CPU, for example, a hardware interrupt number 8 proceeds as follows. The processor suspends execution of the currently executing task at the address specified by the current contents of the code segment (CS) register and the instruction pointer (IP) register. The processor pushes the current contents of the flags register, the CS, and the IP register onto the current stack, as defined by the current stack segment (SS) and stack pointer (SP) registers. These values are pushed onto the stack in the order just described, as illustrated in FIG. 8.

The 386 CPU then determines the beginning execution address for the interrupt number 8 interrupt handler routine via the interrupt 8 vector located in low memory at address 0000h:0020h (20h=4*8). Finally, the processor clears the interrupt flag (IF) and trace flag (TF) bits in the current flags register and continues execution at the beginning address of the interrupt 8 interrupt handler. In short, the processor in real mode saves the current flags and the CS and IP registers on the stack and dispatches the interrupt 8 handler with the IF and TF bits cleared. The processor remains in real mode throughout this process.

Interrupts are handled somewhat differently in virtual mode. To continue with the 386 hrdware interrupt example, such interrupts proceed similarly in that they save the current flags and the CS and IP registers on the stack and dispatch the interrupt handler with the IF and TF bits cleared. In virtual mode, however, the interrupt handler executes at Ring 0 of protected mode and the stack on which the flags and the CS and IP registers are saved is a special Ring 0 stack which is not determined by the SS:SP register combination of the virtual mode task. This stack is illustrated in FIG. 9.

Furthermore, the beginning address of the interrupt handler is not determined by reference to the interrupt vector located at 0000:(int number*4), but instead by an entry in the system's Interrupt Descriptor Table (IDT). The IDT contains an entry for each valid interrupt in the system.

The IDT entries for valid interrupts point to the VDM's code for handling interrupts. Additionally, more virtual-mode task information than just flags, CS, and IP is placed on the ring 0 stack when the interrupt occurs. The virtual mode stack, as determined by the virtual mode task's SS:SP at interrupt time, is not altered.

Interrupt reflection entails manipulation of the ring-0 and virtual-mode stacks to cause results like a real mode interrupt action for the virtual task. The desired end result is virtual-mode execution of the interrupt handler determined by the interrupt vector at 0000h:(4*interrupt number), using the same stack contents and entry flags as would have existed if the interrupt had occurred in real mode.

To achieve this on a 386 CPU, for example, the VDM's interrupt reflection portions may follow the following steps within the protected mode interrupt handler (i.e., within the interrupt reflector).

Step 1: The virtual mode stack segment (SS) and stack pointer (ESP) reside in the ring 0 stack. Decrement the virtual mode ESP value in the ring 0 stack by 6 (3 words).

Step 2: Construct a protected mode address (pointer) to this new virtual mode stack address (SS:ESP in the ring 0 stack). This address pointer for the modified SS:ESP is referred to herein as the VSP.

Step 3: Take the low word of the EFLAGS from the ring 0 stack and place it in the virtual mode stack at VSP+4.

Step 4: Take the CS word from the ring 0 stack and place it in the virtual mode stack at VSP+2.

Step 5: Take the low word of IP from the ring 0 stack and place it in the virtual mode stack at VSP+0.

Step 6: Determine the beginning address for the virtual-mode interrupt handler via the interrupt vector at 0000h:(4*interrupt number).

Step 7: Place the CS for the virtual mode interrupt handler's vector into the ring 0 stack in place of the CS saved for the interrupted virtual-mode task.

Step 8: Place the IP for the virtual mode interrupt handler's vector into the ring 0 stack in place of the low word of EIP saved for the interrupted virtual mode task. Zero the high word of the EIP saved on the ring 0 stack.

Step 9: Clear the IF and TF bits in the EFLAGS in the ring 0 stack.

At this point in the 386 CPU illustration, the VDM's protected mode interrupt handler executes an IRETD instruction to return to virtual mode and execute the virtual mode interrupt handler. The ring 0 and virtual mode stacks should appear generally as illustrated in FIG. 10 when the IRETD begins execution.

In summary, the 386 implementation of the VDM's interrupt reflection logic comprises the following general steps. The processor interrupts a virtual mode task, saves the state of the virtual mode task on the ring 0 stack, and begins execution of the VDM's interrupt handler in ring 0 of protected mode. The VDM's interrupt handler manipulates the virtual mode stack to simulate the action of a real mode interrupt. The VDM modifies the ring 0 stack frame to contain the appropriate entry conditions for the virtual mode interrupt handler (the interrupt handler which would have been executed in real mode). Then the VDM executes an IRETD instruction and the processor returns to virtual mode and executes the virtual mode interrupt handler with the same entry conditions that would have existed in connection with a real mode interrupt.

The 386 implementation of the VDM causes interrupt reflection of software interrupts in a slightly different manner. In the 386 VDM, most software interrupts are designed to generate general protection (GP) faults and thus to enter the VDM protected mode GP fault handler (via IDT entry number 0Dh). This is in contrast to the software interrupts entering VDM via an interrupt handler described by the appropriate entry in the IDT.

When a software interrupt occurs via a GP fault, the 386 CPU inserts an error code at the bottom of the ring 0 stack. To reflect a software interrupt which entered through the GP fault handler, the 386 VDM removes the error code from the ring 0 stack, determines the interrupt number to be reflected by decoding the faulting interrupt instruction, and then proceeds with the same logic used for the hardware interrupts.

To decode the faulting instruction, the 386 VDM creates a pointer to the faulting instruction on the ring 0 stack via the virtual-mode task's CS:EIP registers. The VDM decodes the instruction at this virtual-mode address to verify that it is a software interrupt instruction and to determine the interrupt number for this software interrupt.

The VDM causes most software interrupts to enter the VDM's interrupt handling through the GP fault handler because of certain design characteristics of some computers based on the Intel '86 CPU family. The original design of 8088-based MS-DOS systems ignored Intel warnings which reserved certain IDT entries for future use. When the 80286 processor was introduced, Intel had indeed used some of these IDT entries for processor exceptions related to new instructions and to the protected mode. The result was conflicting usage of these IDT entries. For example, software interrupt 5 (INT 5) is used to instruct the ROM BIOS to print the current contents of the display screen. In the 80286 and the 80386, this interrupt number is generated by the processor when the limit arguments in a BOUND instruction are exceeded.

The problem of overlapping software interrupts and CPU exceptions is solved in the 386 VDM by setting the Descriptor Privilege Level (DPL) of all interrupt gates in the IDT to 0. This causes the INT instruction to generate a GP fault. References to null (all zeroes) IDT entries cause GP faults. This allows unused entries to be filled with zeroes instead of being initialized with a pointer to a default handler. In addition, references to nonexistent IDT entries (beyond the limit of the IDT) cause GP faults, so the IDT can be truncated after the last entry actually used. By forcing all software interrupt instructions through the GP fault handler, the IDT entry use conflict between CPU exceptions and software interrupts is removed.

Potential conflicts of IDT usage also exist in the 386 VDM between hardware interrupts and CPU exceptions. In the COMPAQ Deskpro 286, for example, the interrupt controllers are programmed such that the diskette controller generates an interrupt 14. In the 80386, on the other hand, interrupt 14 is generated by the processor when a Page Fault exception occurs.

The VDM interrupt handler must be able to differentiate between these two conditions. The 386 VDM does so by taking advantage of the fact that the CPU puts an error code onto the stack when generating a Page Fault. Since the top of the ring 0 stack is a known value (it is taken from the TSS when the transition from virtual mode to protected mode occurs), checking for the presence of the error code is simply a matter of measuring the depth of the stack. The stack is one word (the error code) deeper when the interrupt has been entered via processor exception than when it has been entered via hardware interrupt. Other processor exception/hardware interrupt conflicts may be handled in the same manner.

The VDM must handle system errors which occur during virtual-mode execution. Although all system errors encountered by CEMM are signalled by CPU exceptions, some of these exceptions are not errors at all, some of these errors are handled by CEMM, and some errors are sent to the appropriate virtual mode error handler. In general, if an exception is generated by execution in protected mode (by CEMM code), CEMM displays a CEMM Exception Error and halts the system. If an error is generated by a virtual mode task, CEMM will reflect the CPU exception to the corresponding virtual mode exception handler. The two exceptions to this rule are the Invalid Opcode fault and the General Protection fault handlers in VDM. If one of these two faults occurs in a virtual mode task the VMFault routine takes over. VMFault decodes the faulting instruction to differentiate between actual errors and instruction trapping (such as I/O trapping and instruction emulation). The attached pseudocode (Appendix A) describes the error handling logic for the VDM's protected mode CPU interrupt/exception handlers.

The VMFault routine dispatches GP and Invalid Opcode faults to specific handlers based on the CPU instruction which caused the fault. I/O instructions go to the I/O trapping logic. Software interrupts go to the software interrupt emulation and reflection logic. The HLT, CLTS, and LOCK instructions are emulated. The LGDT and LIDT instructions generate privileged operation errors which allow the user to choose between rebooting the system and continuing the system in real mode with CEMM turned off. The MOV r32,CR0, MOV CR0,r32, MOV r32,Drx, and MOV DRx,r32 instructions are emulated. The MOV instructions to/from TRx, CR2, and CR3 generate privileged operation errors. The MOVS instruction is checked for a special case emulation. All other instructions are reflected to the virtual mode invalid opcode interrupt handler.

As part of its instruction decoding the VMFault routine detects and properly handles segment, operand size, and address size overrides. The VMFault routine also detects software interrupts and reflects them to the appropriate virtual mode interrupt handler. The VMFault routine watches for the INT 15h Move Block function described below and calls the VDM Move Block emulation code when needed. The only software interrupt which does not enter VDM through VMFault is the int 67h LIM function software interrupt. This interrupt has its own entry in the IDT which points to the EMM code's interrupt 67h handler.

I/O Trapping

I/O trapping refers to the processor's ability to interrupt the execution of an input/output instruction and pass control to a fault handler in the VDM. The VDM's I/O instruction trapping provides a mechanism for emulating and monitoring I/O instructions executed in virtual mode. Further, the VDM can select which I/O addresses cause trapping.

When the processor executes an I/O instruction in virtual mode and the referenced I/O address has been selected for trapping, the processor interrupts the execution of the I/O instruction, and transitions to the VDM's fault handler in ring 0 of protected mode. The VDM can then emulate the action of the I/O instruction or let the I/O instruction continue normally.

The specific CPU feature used by the 386 VDM to perform the I/O trapping is the I/O Permission Bit Map (IOPBM). The VDM initializes the IOPBM in the TSS and sets the appropriate bits that correspond to the I/O port accesses it wishes to trap. The Deskpro 286 architecture does not fully decode the addresses to the I/O devices on the system board. Only the first 10 bits are uniquely decoded, with the result that system board devices appear every 1K (1024 I/O addresses) within the I/O address space. For this reason, a system board device for which the VDM wishes to trap accesses must have the corresponding bits set every 1024 bits in the IOPBM.

Since the 8086 processor has only 20 address lines, any attempt to access memory locations at or beyond 1 megabyte (the maximum 20-bit address) will 'wrap around' to physical address 0 and access memory locations at the analogous offset from 0. For example, a read from location FFFF:20 will actually read the contents of 0:10. Since the 80286 and 80386 have more than 20 address lines, it is possible for real mode programs to access memory locations up to 64K beyond 1 megabyte. Some applications written before the introduction of the 286 take advantage of this wraparound. For this reason, Deskpro 286 architecture includes a gate that can be used to force the A20 address line to zero. This effectively simulates the wraparound in the hardware of the Deskpro 286.

The Deskpro 386 includes this feature, but when the VDM is executing, addresses above 1 megabyte are being used so A20 cannot be allowed to be forced to 0. The 386 VDM simulates the 1 megabyte wraparound of the 8086 processor by manipulating the page tables appropriately so the 'ForceA20' hardware wraparound is unnecessary.

Applications that attempt to change the A20 line must be prevented from doing so. In the Deskpro 286, the ForceA20 gate is controlled by a bit on the output port of the keyboard controller. Since there are other bits on the output port that an application may wish to set, the 386 VDM implements a 'filter' in order to prevent the ForceA20 bit from being modified. The appropriate bits are set in the IOPBM to cause access to the keyboard controller command and data ports to be trapped. When a command sequence is detected that would cause the output port to be written and therefore the A20 line to possibly be changed, a routine is invoked which modifies data value before it is written to the keyboard controller. In this instance the application believes that it has written a value to the output port of the keyboard controller. The VDM is has trapped the attempt and substituted the application's intended output port value with one that will not affect the ForceA20 bit. The result is that the application 'thinks' it has changed the ForceA20 bit, but the VDM has prevented it.

Intermode Communication

CEMM provides system functions for real and virtual mode tasks. Two methods are provided for accessing CEMM's functions. Real mode and virtual mode programs can obtain the SEGMENT and OFFSET for a FAR CALL entry point within the CEMM device driver. With this FAR CALL address programs can ask CEMM for its current state, cause CEMM to change states, and access VDM debugging utilities. The method for obtaining this FAR CALL address is discussed below in the section on Initialization.

CEMM traps I/O to ports 84h and 85h and uses I/O to these ports as a function call interface for accessing protected mode functions from virtual mode. To access the CEMM protected mode functions via this interface, the user program must output a minor code (function class) to port 84h, then output the CEMM major code to port 85h. CEMM uses the following major/minor codes

| Major | Minor | |
|---|---|---|
| 85h = 00 | | => ROM code |
| | 84h = 0F | => CEMM returns to real mode |
| 85h = 02 | | => CEMM functions |
| | 84h = 00 | => Weitek functions |
| | 84h = 01 | => Diagnostic functions |

Instruction Emulation

Some 386 instructions are privileged and may only be executed at ring 0 privilege level (ring 0 of protected mode or real mode). When a virtual mode task attempts to execute one of these instructions, this causes a GP fault and the VDM's GP fault handler takes over as described in the section above on interrupt handling. Some of these privileged instructions result in privileged operation errors and some are emulated. A privilege operation error gives the user a choice between shutting down CEMM and rebooting the machine. The instruction emulation code attempts to execute the privileged instruction on behalf of the virtual mode task.

The CLTS instruction is emulated by skipping it. The HLT instruction is skipped, unless the virtual mode task's EFLAGS has interrupts disabled. If a virtual mode task executes a HLT instruction with interrupts disabled, VDM will halt the system.

Deskpro 286 Architectural Compatibility

The 386 VDM uses five page tables to provide access to the entire 16 megabytes of physical address space provided on the DESKPRO 286 and provide the 1 megabyte wraparound needed for 8086 compatibility. The 64k of linear address space used for the Expanded Memory Page Frame points to different physical page depending on the EMM page mapping. The rest of the linear address space remains constant and the page tables contain the following linear to physical mapping. The physical address for the COMPAQ Deskpro Memory Diagnostic Byte is also available in the linear address space.

| Linear Addr | Physical Addr |
|---|---|
| 00000000h - 000FFFFFh | 00000000h - 000FFFFFh |
| 00100000h - 0010FFFFh | 00000000h - 0000FFFFh (64k wraparound) |
| 00110000h - 010FFFFFh | 00100000h - 00FFFFFFh (top 15 Meg of physical) |
| 01010000h - 0101FFFFh | 80C00000h - 80C0FFFFh (32 bit mem diags bytes) |

The System ROM Int 15h Move Block function (AH=87h) provides access to extended memory for real mode MS-DOS programs. Because the ROM's code for implementing the function executes in protected mode, CEMM intercepts Move Block function calls (int 15h with AH=87H) and implements the Move Block function in the VDM code. The VDM Move Block function uses a DWORD REP MOVS instruction for faster execution. For more information on the System ROM Move Block function, see the COMPAQ Deskpro 386 Technical Reference.

The LOCK prefix will generate illegal opcode faults on the 386 (and not on the 286) when used with certain instructions. These instructions (with LOCK) do not cause illegal opcode faults and run fine on the 286. When a LOCK prefix generates an illegal opcode fault, VDM's handler increments IP past the LOCK prefix and returns to the instruction. The instruction then executes without the LOCK prefix.

Because some MS-DOS programs reprogram the master 8259 Programmable Interrupt Controller to send interrupts to vectors 50h through 57h, VDM has hardware interrupt handlers for interrupts 50h through 57h.

VDM coordinates with the COMPAQ Deskpro 386 System ROM diagnostic functionality to return the system to real mode when the system is reset by software. At system reset time, the System ROM outputs a 0Fh to I/O port 84h followed by a 00h to I/O port 85h. This sequence of values output to this port cause CEMM to return the system to real mode.

EMM (EXPANDED MEMORY MANAGER)

The EMM part of CEMM emulates bank-switched memory using paged memory management in those members of the Intel '86 family of microprocessors having paging capabilities. When the processor is executing in Virtual mode, paging may be enabled to translate a linear address generated by the Virtual mode task into a physical address. The EMM part of CEMM modifies entries in the system page tables to cause different physical memory pages to appear at the same linear address. Thus, the EMM emulates bank-switched memory for a Virtual mode task. An MS-DOS program accesses the bank-switching capabilities in the EMM part of CEMM via the software interface described in the LIM Expanded Memory Specification.

The following section describes the implementation of a LIM expanded memory driver for the COMPAQ DESKPRO 386 and in particular the data structures used by the EMM part of CEMM. It should be appreciated that most of the EMM code executes in protected mode. All code which alters the system page tables must execute in protected mode because all page table changes must be finalized by flushing the processor's internal cache and reloading the CR3 register. This is a ring 0 instruction.

EMM DRIVER DESIGN SPECIFICATION

The following sections discuss both the overall structure of the EMM driver and the internal data structures used to implement the LIM standard driver. This design specification replicates some of, but not all, the information in the LIM specification document. Thus, the LIM specification document incorporated by reference into this disclosure may be used as reference particularly for information on the EMM driver and functions.

The following is a glossary of terms used in this driver design specification.

Page Frame: The 64K range of the address space (linear in VM) in which the EMM memory is accessed by application programs.

Window: One of the four 16K address ranges which comprise the Page Frame. Also known as "page frame window."

EMM Page: A 16K page of memory which can be mapped into a page frame window.

EMM Pool: The collection of EMM Pages which are available to application programs. Sometimes abbreviated "Pool."

386 Page: A 4K page of memory as defined by the 386 memory paging mechanism.

Handle: When pages are allocated by a process, the EMM returns a "Handle" to the process and the process must use this Handle when accessing its pages.

Logical Page: When a process allocates N EMM pages, it refers to its EMM pages as page #0 through page #(N−1). These are Logical Page numbers.

The COMPAQ Expanded Memory Manager implements expanded memory via the paging mechanism of the 80386 microprocessor or equivalent which is operating in virtual mode. The memory which appears as expanded memory for processes running in virtual mode (under CEMM) is actually extended memory. The EMM driver in CEMM provides expanded memory in virtual mode by mapping physical extended memory into linear page frame addresses. CEMM manipulates the 386 page tables entries for the page frame linear addresses to point to an extended memory pool.

The COMPAQ EMM driver allocates some extended memory to use as the EMM pool. An EMM page corresponds to four continguous 4K 386 pages in extended memory. Thus, the EMM performs the Map Handle Page function (function 5) by changing the four page table entries for the requested page frame window to point to the four 386 pages which comprise the requested EMM page.

The COMPAQ EMM driver emulates the standard LIM software interface as described in the LIM specification document. This EMM driver also provides limited emulation of the LIM hardware by emulating the functionality of the mapping registers on a LIM expanded memory board.

The CEMM EMM driver emulates the expanded memory board mapping registers by using the 386 I/O Bit Map capability to trap I/O to the registers, and then emulating the requested page mapping as if the user had made the request through the Map Handle Page function (function 5). There are four mapping registers for each Expanded Memory Board (EMB) emulated. Each of the four mapping registers corresponds to a unique page frame window. The highest bit (bit 7) of a mapping register is the Page Enable Bit. The low 7 bits (bits 0-6) of a mapping register contain an EMM page number.

If a process writes a value with the page enable bit set to a mapping register, the EMM hardware emulation will map the appropriate EMM page into the corresponding window. If a process writes a value with the page enable bit reset to a mapping register, the window will be mapped to the window's "true" physical address (no mapping).

Since there are 4 mapping registers per expanded memory board and up to 4 boards are supported by the EMM driver, up to 16 mapping registers may "appear" in the I/O space of CEMM. The number of expanded memory boards emulated depends on the amount of memory allocated for use as CEMM expanded memory. One expanded memory board is emulated for each 2 Megabytes of memory allocated for CEMM expanded memory. The following table lists the possibilities for the I/O addresses for the emulated mapping registers. The four I/O addresses used for each board are selected from one line of the list below, by the user when the CEMM driver is loaded.

| I/O Address for Mapping Registers | | | |
|---|---|---|---|
| Window | | | |
| 0 | 1 | 2 | 3 |
| 0208h | 4208h | 8208h | C208h |
| 0218h | 4218h | 8218h | C218h |
| 0258h | 4258h | 8258h | C258h |
| 0268h | 4268h | 8268h | C268h |
| 02A8h | 42A8h | 82A8h | C2A8h |
| 02B8h | 42B8h | 82B8h | C2B8h |
| 02E8h | 42E8h | 82E8h | C2E8h |

The DMA controller accesses physical memory without going through the 386 paging mechanism; therefore, when a process attempts to set up the DMA to use one of the page frame windows, the EMM driver must re-map the DMA page register/base linear address written by the virtual mode task to the physical address of the EMM page involved. CEMM's EMM driver achieves this by trapping accesses to the DMA page registers and base addresses in order to remap DMA transfer linear addresses to the address range of the physical pages when necessary.

The DMA mapping becomes more complicated when a process attempts to perform a DMA operation which uses more than one window. Since the DMA controller accesses physical memory without going through the 386 paging mechanism, memory which appears contiguous in the linear address space (for virtual mode programs) may not appear contiguous to the DMA controller's address space. Therefore, a virtual mode program may set up a DMA operation across more than one window (windows are contiguous for virtual mode memory accesses) and the physical EMM pages corresponding to these windows may not be contiguous for the DMA controller accesses. If this happens, CEMM must reassign a new set of physical pages for the EMM pages in the windows involved in the DMA transfer such that the new set of physical pages are contiguous.

Another problem which must be addressed is the physical 64K, or 128K, wrap feature of the DMA controller in a Deskpro 286 TM compatible architecture. This problem is known as the physical 64K boundary problem. The 8237 DMA controllers in this architecture generate addresses having a maximum of 16 bits. A byte transfer controlled by the master 8237 rolls over to address 0 after a transfer at address FFFFh. Thus, the byte oriented master DMA controller cannot transfer across a physical 64K boundary. Similarly, the slave DMA controller, which is word oriented, cannot transfer across a physical 128k boundary.

Programs designed for a Deskpro 286 TM compatible architecture are written to be compatible with this limitation and do not attempt DMA transfers across a 64K or 128K boundary. Since the 128K boundary problems and solutions are an obvious extension of the 64k boundary problems and solutions, only the 64k boundary will be discussed here. When programs initiate a DMA transfer in virtual mode they merely avoid the Linear 64K boundary and a Physical 64K boundary problem may still exist in the physical pages corresponding to the linear pages of the DMA transfer range. Thus, for the EMM windows in CEMM, even if a DMA transfer involves only one window (which never has a 64K boundary in the Linear addresses space), the physical pages for that windows may contain a physical 64K boundary. If these physical pages do contain a physical 64K boundary, CEMM must reassign a new set of physical pages for the EMM page in the window such that no 64K boundary exists in the physical pages.

In summary, there are three parts to the DMA problem: the DMA controller places physical addresses on the processor bus and virtual mode tasks attempt to program the controller with a linear address range which may not be the same as the physical address range (due to paging); although the virtual mode task attempts to program the DMA controller with a contiguous linear address range, the set of physical pages for this range of linear addresses may not be contiguous; and, finally, the set of physical pages for the linear address range may contain a physical 64K boundary.

CEMM solves the DMA problem by trapping accesses to the DMA controller and applying and address mappings or swapping at that time. CEMM traps all I/O accesses to the system registers associated with DMA transfers. This includes the Base and Count registers for the two 8237 DMA controller chips and the DMA page registers for the DMA channels used in a Deskpro 286 TM compatible computer. When a task outputs a DMA transfer address and count to a DMA controller, CEMM checks the page tables to see if this DMA transfer requires any fixups. If not, the CEMM programs the actual DMA controller with the DMA address and count specified by the virtual mode task. Since most DMA transfers do not use the EMM page frame and the EMM page frame is the only linear address range which is not mapped linear-equal-to-physical (one-to-one) by CEMM, most DMA transfers will not require a fixup. However, if the DMA transfer does require a fixup, CEMM performs any address translations and page swapping required, then programs the actual DMA controller with the necessary physical address. CEMM checks the DMA transfer address at every write to a DMA base register, DMA count register, or DMA page register. CEMM checks the address at each of these points in the absence of a general method for determining when a virtual mode task has finalized its DMA transfer range.

CEMM uses the following process to verify a linear DMA transfer address range. First, CEMM checks to see if the physical pages for the linear address range are not the same as the linear pages. If the linear pages are equal to the physical pages, no fixup is required. Otherwise, the physical pages are not equal to the linear pages and CEMM checks the set of physical pages for the linear transfer range and verfies that the physical pages are contiguous and do not contain a physical 64K boundary. If the pages are physically contiguous and do not have a physical 64K boundary, then CEMM sets up the DMA controller (and page registers) with the physical transfer range determined by the set of physical pages. Otherwise, either the set of physical pages are not continguous or there is a physical 64K boundary, and a CEMM must allocate a new set of physical pages for the DMA transfer linear pages. Furthermore, the new set of physical pages must be both contiguous and free of any 64K physical boundaries.

CEMM uses a two step process to allocate a new set of physical pages for a linear transfer range. First, CEMM finds an appropriate set of physical pages. Then, for each physical page, CEMM swaps the contents of the current physical page and the new physical page, changes the ownership of the physical page within the EMM data structures by swapping entries in the _pft386 array, and updates the page table entries for the the EMM page frame windows with the new physical pages.

The DMA transfer fixup solution entails determining an algorithm for finding an acceptable set of physical pages for the DMA transfer. When searching for a set of acceptable physical pages, it would be more efficient in swapping time if some of the physical pages in the transfer range could be used as the final set. In other words, it is preferable to only swap as many pages as necessary, and no more than are necessary. Unfortunately, an optimal algorithm such as this is not only difficult to devise, but may also take quite some time to execute. CEMM's algorithm is not optimal; however, it is simple in design and easily implemented.

During CEMM's initialization, CEMM searches through the pool of EMM pages for a set of physically contiguous pages which are free of 64K boundaries. At initialization time, this is a relatively easy task. These physical pages are known as the DMA Pages. Whenever CEMM needs a set of physical pages for a DMA transfer, it uses the DMA Pages. Thus, whenever CEMM swaps the physical pages for a DMA transfer, it will swap all of the pages. This can take a long time; however, most DMA transfers in a Deskpro 286 TM system are small transfers which reside entirely within one page and never require page swapping.

The EMM data structures allow efficient swapping of physical pages. The _pft386 array and the concept of an EMM page number allow the DMA fixup logic to swap the physical pages for an EMM page by merely exchanging entries in the _pft386 array and exchanging the contents of the physical pages. Alternative implementations of EMM data structures could have problems swapping physical pages if the EMM page number was directly linked to the physical page. A direct link would cause problems for programs which gain access to the EMM page# through LIM function 11.

There are situations where the DMA mapping cannot proceed. In these cases, CEMM programs the DMA controller with the linear address written by the virtual mode task and hopes for the best. CEMM takes this approach because of the possibility that the address that CEMM is attempting to fixup may be considered invalid by the virtual mode task. This can happen because the virtual mode task programs the DMA controller before it validates its own DMA transfer buffer address or because CEMM checks the DMA addresses at all times (even when they are not yet completely written to the controller). The following four classes of DMA transfers are not fixed by CEMM.

(1) The DMA transfer spans more than one page frame window and at least one (but not all) of the windows is currently unmapped.

(2) The DMA transfer spans more than one page frame window with the same EMM page residing in more than one of the windows.

(3) The DMA transfer spans more than one page frame window, but there are not enough physically contiguous EMM pages in which to locate the transfer.

(4) The DMA transfer includes memory both inside and outside the page frame and one or more page frame windows is mapped.

The following is a description of the Expanded Memory Manager (EMM) data structures. The data structures are defined and their use to implement the EMM functions is described.

Figure 11:
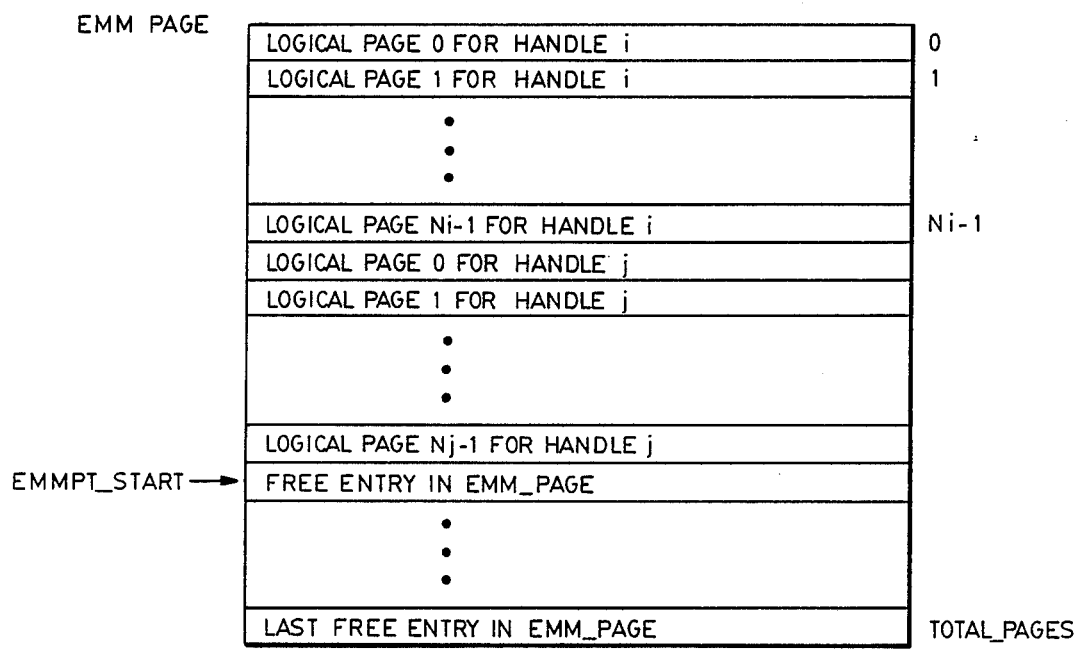
FIGS. 11 and 12 are memory maps of portions of memory used in a program according to one embodiment of the invention.
Figure 12:
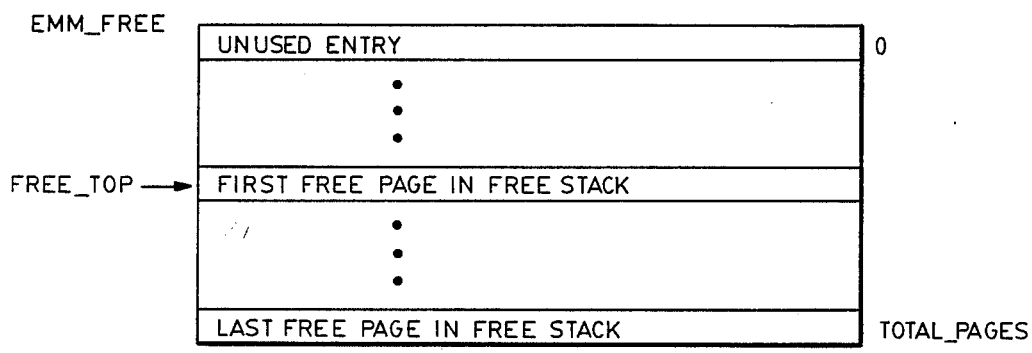

Constants:
HANDLE_CNT = 255;  /* max number of EMM handles */
EMM_PAGE_CNT = 512;  /* max number of EMM pages */
NULL_PAGE = 0×FFFF;  /* null page value */
NULL_HANDLE = 0×0FFF;  /* null handle value */
  a. unsigned char            EMMstatus
      Current status of EMM driver.
      0 => OK. 81h=> EMM h/w error.
  b. unsigned short            PFBase
      Segment address of the start of the page frame.
  c. unsigned short            total_pages
      Total # of EMM Pages available for expanded memory.
  d. unsigned char            map_size
      Number of expanded memory mapping registers emulated.
  e. unsigned char            current_map[16]
      Contains the current values for all mapping registers emulated in the system.
  f. unsigned short            window[4]
      Contains the current EMM page # for all windows.
      NULL_PAGE for windows which are not mapped.
  g. unsigned short            iomap[16]
      I/O addresses for the emulated mapping registers. Board #i's mapping register addresses are in the entries i*4 thru i*4 3.
  h. struct handle_ptr        handle_table[HANDLE_CNT];
      struct handle_ptr {
      unsigned short            page_index; /* index of list in emm_page */
      unsigned short            page_count; /* # of pages for this handle */
      }
      This array contains the state info for all possible EMM handles. The state info for a handle consists of the number of pages allocated for the handle and an index into emm_page[ ]for the first page in the handle's list of pages.
  i. unsigned short            handle_count;
      handle_count is the number of active handles.
  j. struct savemap           save_map[HANDLE_CNT];
      struct save_map {
unsigned short          shandle;      /* handle for this save area */
unsigned short          window[4];    /* save context for window[ ]*/
}
      This array is the internal save area for the save page map and restore page map EMM functions. This EMM page frame state is stored in this save area as the contents of the array window[ ].
  k. unsigned emm_page[total_pages];
  l. unsigned short emmpt_start
Collection of lists of EMM Pages. Each word in this array is an EMM Page #. This array is a collection of lists of the -continued EMM Pages for each active Handle. FIG. 11 illustrates this
for the case where there are two active handles: Handle i and Handle j.
emmpt_start is the index of the first free entry in emm_page[ ]
(as shown in FIG. 11). When a new handle's pages are allocated,
its list of pages will begin here.
  m. unsigned short emm_free[total_pages];
  n. unsigned short free_top;
  o. unsigned short free_count;
emm_free is a stack of the free EMM pages. free_top is the
index of the top (lowest index) free page in the free page stack.
free_count is the number of free pages. FIG. 12 illustrates this
structure. Each entry in the free stack is an EMM page #
(0 thru (total_pages-1)).
  p. unsigned long far     *page_frame_base[4];
    Far pointers (off,selector) to the entries in the page tables
    for the 4 page frame windows (i.e. page_frame_base[2] is a far
    pointer to window # 2's entry in the page tables). These
    contain a selector instead of a segment because the page tables
    are changed only in protected mode.
  q. unsigned long _pft386[total_pages];
    _pft386[i] is the 386 Page Table entry for the first 386 page in
    EMM Page #i ( 32 bit address with low 12 bits for paging status
    and access rights ). This array is used by the "DMA handler".
    This array allows the DMA handler to change to physical
    location of the contents of an EMM page without invalidating
    the rest of the EMM data structures ( the EMM page #
    (or board#, page#) can stay the same ).

Comments on Use of Data Structures

The arrays emm_page[ ], emm_free[ ], and _pft386[ ] only require one entry per EMM page the the EMM Pool. Thus, the memory "allocated" for these arrays is dependent on the size of the EMM Pool. The actual definition of these variables in an .ASM file would be as words which contained pointers to the memory corresponding to the appropriate array (instead of using DUPs to allocate the memory). This permits dynamic allocation of memory for these data structures based on the total number of EMM pages in the EMM Pool.

The EMM function 11 (get Logical to Physical) returns (board#,page#) for the physical location of an EMM Page; however, the COMPAQ EMM driver does not use expanded memory boards and uses EMM Page#s for its internal data structures. The scheme for mapping (board#,page#) to EMM page # follows:

| EMM Page # | (Board#,Page #) |
|---|---|
| 0 | (Board 0,Page 0) |
| 1 | (Board 0,Page 1) |
| " | " |
| " | " |
| 127 | (Board 0,Page 127) |
| 128 | (Board 1,Page 0) |
| 129 | (Board 1,Page 1) |
| " | " |
| " | " |
| 255 | (Board 1,Page 127) |
| 256 | (Board 2,Page 0) |
| 257 | (Board 2,Page 1) |
| " | " |
| " | " |
| 383 | (Board 2,Page 127) |
| 384 | (Board 3,Page 0) |
| 385 | (Board 3,Page 1) |
| " | " |
| " | " |
| 511 | (Board 3,Page 127) |

Figure 13:
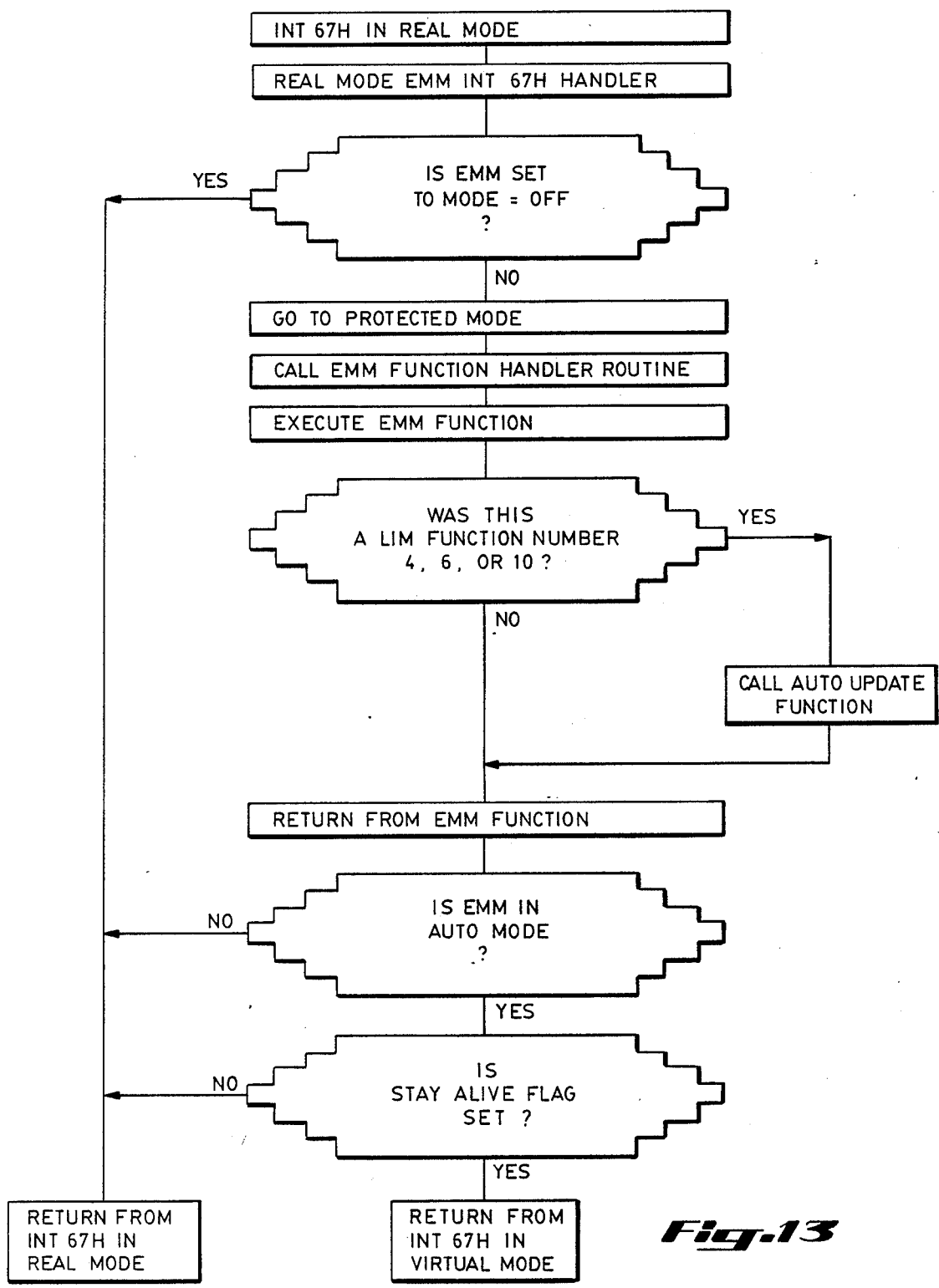
Figure 15:
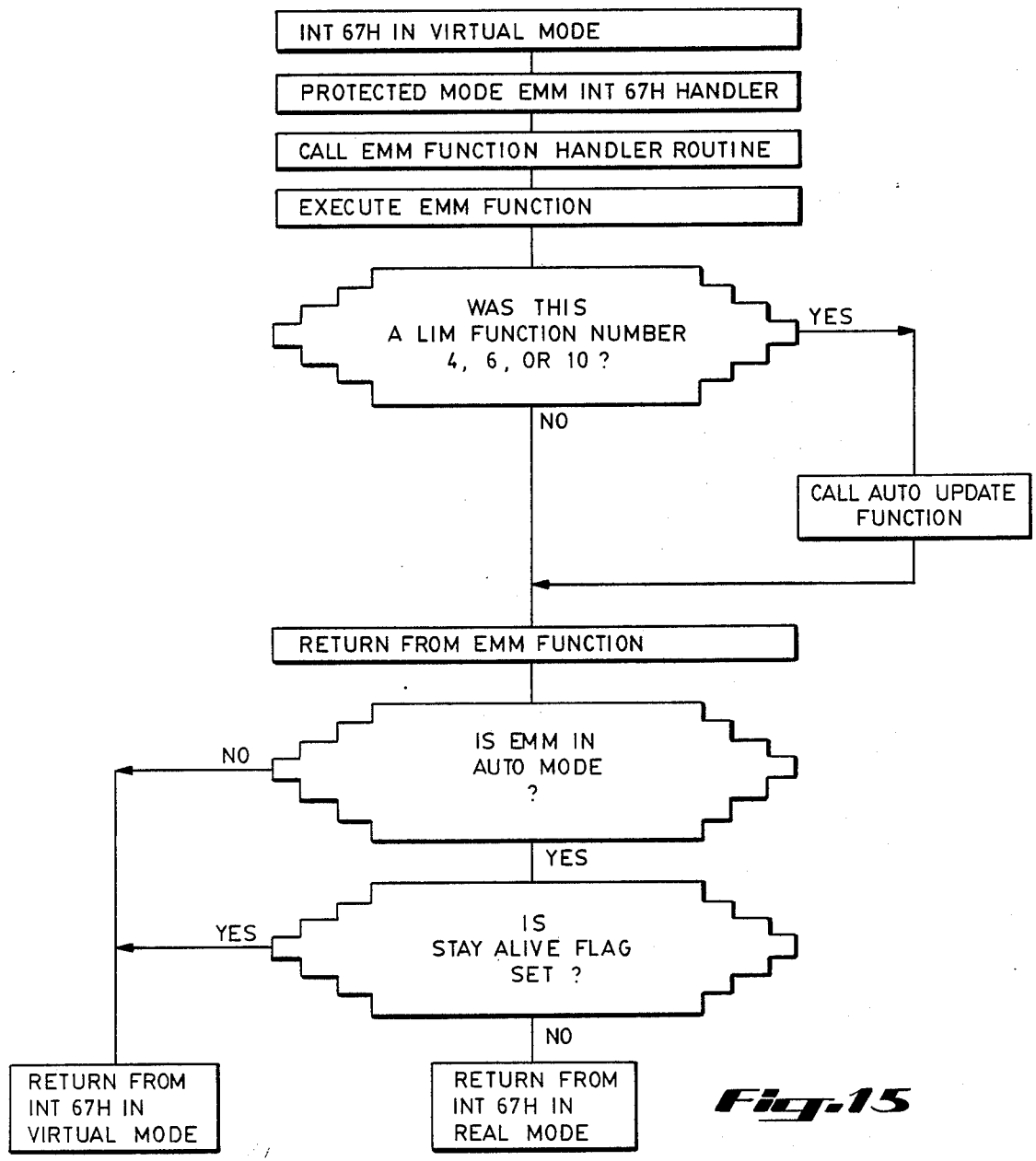

CEMM provides an AUTO mode in which it detects when an application program attempts to access Expanded Memory and only runs MS-DOS in virtual mode when necessary, otherwise MS-DOS runs in real mode. AUTO mode is useful because the system will run faster in real mode and because there are some programs which use protected mode instructions themselves. Since AUTO mode leaves the system in real mode unless CEMM's expanded memory emulation is in use, programs which use protected mode and don't use expanded memory will run without generating a CEMM exception error. Additionally, CEMM must be active (MS-DOS in virtual mode) when a program wishes to access data in expanded memory. When set to AUTO mode, CEMM determines when it must be active by monitoring the LIM calls made to the system and the number of active EMM Handles. CEMM has a Stay Alive flag for AUTO mode, which determines whether or not CEMM should be active when in AUTO mode. Since a program cannot map pages into a page frame window unless it has allocated this page to an active EMM Handle, CEMM does not need to be active if there are no active EMM Handles. CEMM will set the Stay Alive flag as long as there are active EMM Handles (EMM Handles with EMM pages allocated to them). Since LIM function 10 returns the I/O addresses of all emulated mapping registers. Since CEMM can only emulate, or monitor, accesses to the mapping register when the system is in virtual mode, CEMM must remain active at all times after these I/O addresses are known. Thus, if a LIM function 10 call is issued to CEMM, CEMM sets a flag which causes AUTO mode to become equivalent to CEMM ON mode and CEMM stays active. The flowcharts in FIGS. 13, 14, and 15 depict CEMM's AUTO mode logic. The flowcharts in FIGS. 15 and 13 depict the path through the EMM part of CEMM when an MS-DOS program issues an int 67h LIM call while the processor is in virtual mode (CEMM active) and in real mode (CEMM inactive). The flowchart in FIG. 14 shows the logic of the AUTO mode update routine.

The EMM part of CEMM also emulates a set of hardware registers known as LIM mapping registers. A more complete description of this functionality may be found in a document entitled "Compaq Expanded Memory Manager 386 Functional Spec" the contents of which are incorporated by reference into this disclosure.

INITIALIZATION CODE

CEMM is a MS-DOS device driver structured in the manner defined for Expanded Memory Managers in the LIM Expanded Memory Specification. The initialization code interprets the device driver command line arguments, allocates the system memory to be used by CEMM, initializes all VDM and EMM data structures, and checks for various error states in the process.

As part of the initialization process, CEMM verifies that the DOS version is in the range of 3.1 to 3.9 and that the processor supports virtural mode. If any of these fail, CEMM displays an error message and exits. Preferably the code before the processor check and the exit code followed after a failed processor check should use only 8086 instructions to avoid any possible illegal opcode faults when attempting to exit when running on an 8086/8088 processor.

The command line arguments for the CEMM.EXE device driver are described in the CEMM functional specification. One part of this process which deserves special attention is the selection of a page frame when the user has not specified one. When the user does not specify a page frame base address, CEMM looks for one. CEMM does this by searching for existing option ROMs or RAM in the area of memory which could be used for the page frame. When CEMM finds an option ROM or RAM, it disqualifies all page frame base addresses which would cause the page frame to include this ROM or RAM. After determining which page frame base addresses are invalid, CEMM chooses one of the valid page frame base addresses by first examining M9 (E0000h) and moving down to M8 (DC000h), M7, ... M1 in turn, as necessary. CEMM uses the first valid page frame it finds in the process. When the user specifies a page frame base address, CEMM searches for option ROMs only, and warns the user if there is a conflict. Because some network boards are sensitive to CEMM's search for RAM, no RAM search is performed when the user specifies a page frame base address.

CEMM has an interface to allow the CEMM utility program and test programs to request service of CEMM or issues commands to CEMM. This interface consists of a predefined location within the CEMM device driver segment which holds the offset address for calling the CEMM function dispatch routine. When CEMM installs, it sets up a software interrupt 67h interrupt handler via the interrupt vector loaded at 0000:(4*67h). The segment portion of this interrupt handler address is the same segment used by the CEMM device driver. For the purposes of the following discussion this is designated segment value CS67. CS67:0000 points to the beginning of the CEMM device driver. CS67:0014 points to the following ASCII string within CEMM: "COMPAQ EXPANDED MEMORY MANAGER 386." CS67:0012 points to a word which contains the offset with the CS67 segment for the CEMM function dispatch routine. For the purposes of this discussion, this word offset is designated as CIP. To issue a call to CEMM, a program would do a FAR call to CS67:CIP. The signature allows a program, including the CEMM utility program, to determine that CEMM is installed.

Since CEMM uses extended memory to emulate expanded memory, CEMM has a method for allocating extended memory. CEMM must be careful to not use the same extended memory as another MS-DOS program, and CEMM must prevent other programs from using the extended memory which CEMM intends to use for expanded memory emulation. In one embodiment of the invention the same scheme for allocating extended memory as the IBM VDISK program is used. This allows CEMM to operate along with a VDISK program without any conflicts in their use of extended memory. In another embodiment, CEMM memory allocation uses a different scheme. CEMM still detects when a VDISK has allocated extended memory and does not attempt to allocate the same memory. However, in this embodiment CEMM allocates extended memory by emulating the system ROM int 15h Extended Memory Determination function (AH=88h. see COMPAQ Deskpro 386 Technical Reference). This method allows CEMM to coexist with non-VDISK compatible applications which use extended memory.

The Data and code requirements of the VDM amount to almost 48K in the preferred embodiment of CEMM. Because the purpose of LIM is to make more memory available to MS-DOS programs, CEMM moves some of the VDM code and data from the base memory where it was loaded by the MS-DOS device driver startup code to other memory in the system where it will not reduce the amount of memory available to normal MS-DOS programs. On the COMPAQ Deskpro 386, there is RAM located from E0000h to EFFFFh. This RAM is normally free and CEMM places some of its data and code there. In particular, CEMM will place the GDT, IDT, TSS, system page tables, and most of its protected mode code in this RAM.

---

APPENDIX A - VDM Interrupt Handlers (pseuedocode)

```
Interrupt 0
    Source: CPU - Divide error fault
    IF (EFLAGS => Virtual Mode) THEN
    REFLECT interrupt to virtual mode exception 0 handler
    ELSE
    CEMM Exception Error # 0
    ENDIF
Interrupt 1
    Source: CPU - Debug Trap
    IF (EFLAGS => Virtual Mode) THEN
    REFLECT interrupt to virtual mode exception 1 handler
    ELSE
    CEMM Exception Error #1
    ENDIF
Interrupt 2
    Source: H/W - NMI
    IF (EFLAGS => Virtual Mode) THEN
    REFLECTS interrupt to virtual mode exception 2 handler
    ELSE IF (Parity Error) THEN
    CEMM Exception Error # 2
    ELSE
    Toss exception - just IRET
    ENDIF
Interrupt 3
    Source: CPU - INT 3 instruction (should not enter here)
    CEMM Exception Error # 3
Interrupt 4
    Source: CPU - INTO instruction (should not enter here)
    CEMM Exception Error # 4
Interrupt 5
    Source: CPU - Array bounds fault
    IF (EFLAGS => Virtual Mode) THEN
    REFLECT interrupt to virtual mode exception 5 handler
    ELSE
    CEMM Exception Error # 5
    ENDIF
Interrupt 6
    Source: CPU - Invalide Opcode fault
    IF (EFLAGS => Virtual Mode) THEN
    go to VMFault routine
    ELSE
    CEMM Exception Error # 6
    ENDIF
Interrupt 7
    Source: CPU - Coprocessor not present fault
    IF (EFLAGS => Virtual Mode) THEN
    REFLECT interrupt to virtual mode exception 7 handler
    ELSE
    CEMM Exception Error # 7
    ENDIF
Interrupt 8
    Source: CPU - Double Fault
    H/W - IRQ0 - System timer
    IF ( ring 0 SP => H/W interrupt from Virtual Mode ) THEN
    REFLECT interrupt to virtual mode interrupt 8 handler
    ELSE
    CEMM Exception Error # 8
    ENDIF
Interrupt 9
    Source: CPU - none
    H/W - IRQ1 - Keyboard
    REFLECT interrupt to virtual mode interrupt 9 handler
Interrupt 10
    Source: CPU - Invalid TSS fault
    H/W - IRQ2 - Casade from slave 8259 (should not happen!)
    CEMM Exception Error # 10
Interrupt 11
    Source: CPU - Segment Not Present fault
```

-continued

APPENDIX A - VDM Interrupt Handlers (pseuedocode)

```
    H/W - IRQ3 - COM2
    IF (EFLAGS => Virtual Mode)
        REFLECT interrupt to virtual mode interrupt 11 handler
    ELSE
        CEMM Exception Error # 11
    ENDIF
Interrupt 12
    Source: CPU - Stack fault
    H/W - IRQ4 - COM1
    IF (EFLAGS => Virtual Mode)
        REFLECT interrupt to virtual mode interrupt 12 handler
    ELSE
        CEMM Exception Error # 12
    ENDIF
Interrupt 13
    Source: CPU - General Protection Fault
    H/W - IRQ5 - Second parallel printer
    IF ( ring 0 SP => H/W interrupt from Virtual Mode ) THEN
        REFLECT interrupt to virtual mode interrupt 13 handler
    ELSE IF (ring 0 SP => GP fault from Virtual Mode ) THEN
        go to VMFault routine
    ELSE
        CEMM Exception Error # 13
    ENDIF
Interrupt 14
    Source: CPU - Page fault
    H/W - IRQ6 - diskette interrupt
    IF (ring 0 SP => H/W interrupt from Virtual Mode ) THEN
        REFLECT interrupt to virtual mode interrupt 14 handler
    ELSE
        CEMM Exception Error # 14
    ENDIF
Interrupt 15
    Source: CPU - none
    H/W - IRQ7 - parallel printer
    REFLECT interrupt to virtual mode interrupt 15 handler
Interrupt 16
    Source: CPU - Coprocessor Error
    CEMM Exception Error # 16
Interrupt 50h-57h
    Source: Master 8259 is sometimes programmed to here
    REFLECT interrupt to virtual mode interrupt 50h-57h handler
Interrupt 67h
    Source: Software Interrupt 67h
    IF (EFLAGS => Virtual Mode)
        REFLECT interrupt to virtual mode interrupt 67 handler
    ELSE
        CEMM Exception Error # 34
    ENDIF
Interrupts 70h-77h
    Source: Slave 8259 interrupts
    REFLECT interrupt to virtual mode interrupt 70h-77h handler
```

What is claimed is:

1. A method of operating a computer system, the computer system including a CPU having an address range of greater than 1-Mbyte, a memory having a continuous physical address range of greater than 1-Mbyte, and addressing means connecting said CPU to said memory, comprising the steps of:
   (a) addressing said memory by said CPU alternatively in:
   a first address mode wherein addresses generated in said CPU are directly used as the physical addresses to access said memory, or
   a second address mode wherein addresses generated within said CPU are translated using table entries to physical addresses used to access said memory;
   (b) executing an operating system for said CPU stored in said memory using either said first address mode or said second address mode,
   said operating system defining a user memory area of 0-to-640 Kbyte and a system memory area of 640 Kbyte to 1-Mbyte,
   said operating system further defining a protocol permitting said CPU to respond to a bank-switched memory access command generated within said CPU by addressing a bank-switched memory system; and
   (c) in response to a said bank-switched memory access command, accessing an extended memory portion of said memory having a continuous physical address range of greater than 1-Mbyte while executing said operating system,
   said extended memory portion having physical addresses above 1-Mbyte,
   by operating said addressing means in said second address mode and employing a plurality of said table entries of said addressing means selectively mapped to an expanded memory page frame within said system memory area to access said extended memory portion.

2. A method according to claim 1 wherein said expanded memory page frame is 64 Kbyte in size and includes four 16 Kbyte windows.

3. A method according to claim 1 wherein said step of addressing said memory includes a protected addressing mode in said second address mode,
   the protected addressing mode providing protected address ranges defined in said table entries.

4. A method according to claim 1 including the step of addressing a virtual disk drive also located in said memory having physical addresses above 1-Mbyte but separate from said extended memory portion.

5. A method according to claim 1 wherein said step of addressing in said second mode includes adding the contents of a segment register to the contents of an address register to generate an address in said CPU, before translating said address using said table entries.

6. A method according to claim 5 wherein said step of addressing includes copying a plurality of said table entries to a local store from said memory, and loading said segment register from a segment table.

7. A method according to claim 1 wherein said CPU executes more than one copy of said operating system by allocating portions of said memory for each said operating system copy using said second address mode and using a set of said table entries for each said copy.

8. A method according to claim 1 including the step of searching said system memory area to find an unallocated portion of said system memory area to define said expanded memory page frame.

9. A computer system comprising: p1 (a) a CPU having an address range of greater than 1-Mbyte;
   (b) a memory having a continuous physical address range of greater than 1-Mbyte;
   (c) addressing means connecting said CPU to said memory,
   said addressing means including a first address mode wherein addresses generated in said CPU are directly used as the physical addresses to access said memory,
   and including a second address mode wherein addresses generated within said CPU are translated using table entries to provide physical addresses used to access said memory;
   (d) an operating system for said CPU stored in said memory and defining a user memor area of 0-to-640 -Kbyte and a system memory area of 640 Kbyte to 1-Mbyte;
   (e) means for accessing an extended portion of said memory while executing said operating system, said extended memory portion having physical addresses above 1-Mbyte, (f) and means for operating said addressing means in said second address mode and for employing a plurality of said table entries of said addressing means to selectively map said extended memory portion to an expanded memory page frame within said system memory area.

10. A computer system according to claim 9 wherein said expanded memory page frame is 64 Kbyte in size and includes four 16 Kbyte windows.

11. A computer system according to claim 9 wherein said addressing means includes a protected addressing mode in said second mode, the protected addressing mode providing protected address ranges defined in said table entries.

12. A computer system according to claim 9 wherein said memory having a continuous physical address range of greater than 1-Mbyte also includes a virtual disk drive separate from said extended memory portion.

13. A computer system according to claim 9 wherein said addressing means includes a segment register containing a segment address loaded under control of said operating system, and includes at least one address register, and the CPU address includes the contents of the segment register and said address register.

14. A method of emulating expanded memory using a CPU having an address range of greater than 1-Mbyte, a memory having a continuous physical address range of greater than 1-Mbyte, and using an addressing means connecting said CPU to said memory, comprising the steps of:

(a) executing an operating system on said CPU defining separate user memory and system memory areas within a range of greater than 1-Mbyte;

(b) addressing said memory by said CPU in an address mode wherein virtual addresses generated within said CPU are translated to physical addresses used to access said memory using page table entries;

(c) and accessing an extended memory portion of said memory while executing said operating system, said extended memory portion having physical addresses above the address range of 1-Mbyte, employing a plurality of said table entries of said addressing means selectively mapping parts of said extended memory portion to an expanded memory page frame within said system memory area.

15. A method according to claim 14 wherein said step of addressing said memory includes a protected addressing mode in said address mode, the protected addressing mode providing protected address ranges defined in said page table entries.

16. A method according to claim 14 including the step of addressing a virtual disk drive also located in said memory having a continuous physical address range of greater than 1-Mbyte, said virtual disk drive having physical addresses separate from said extended memory portion.

17. A method according to claim 14 wherein said step of addressing includes adding the contents of a segment register to the contents of an address register to generate said virtual address in said CPU, before translating said virtual address using said page table entries.

18. A method according to claim 14 wherein said user memory area is in a range of about 0 to 640 Kbytes and said system memory area is in a range of about 640 Kbytes to 1-Mbyte.

19. A method according to claim 14 wherein said CPU executes more than one copy of said operating system by allocating portions of said memory for each said operating system copy using said address mode and using a set of said page table entries for each said copy.

20. A method according to claim 19 wherein each said copy of said operating system accesses a different extended memory portion using a different expanded memory page frame.

21. A method of operating a computer system of the type having a real mode of operation and a virtual mode of operation, and having a plurality of levels of protection, comprising the steps of:

(a) executing a task in said virtual mode at a predefined level of protection;

(b) while executing said task, detecting a hardware interrupt and interrupting said task by saving the current state of said task in a stack at a level of greater protection than said predefined level;

(c) then executing an interrupt handler at said level of greater protection to create a new stack to simulate an interrupt in said real mode, the new stack containing the entry conditions for a virtual mode interrupt handler;

(d) returning to virtual mode and executing a virtual mode interrupt handler using said new stack to provide the same entry conditions as if the interrupt had been in real mode.

22. A method according to claim 21 wherein said new stack contains said current state of said task.

23. A method according to claim 22 wherein said predefined level is level 3 and said level of greater protection is level zero which is the level of greatest protection.

24. A method of operating a computer system of the type having a real mode of operation and a virtual mode of operation, and having a plurality of levels of protection in said virtual mode, comprising the steps of:

(a) executing a task in said virtual mode at one of said levels of protection;

(b) while executing said task, detecting a software interrupt and interrupting said task by entering a fault routine and saving the current state of said task in a stack at a higher level of protection than said one level;

(c) then executing an interrupt handler selected by decoding the instruction causing said software interrupt, at said higher level of protection, to create a new stack to simulate an interrupt in said real mode, the new stack containing the entry conditions for a virtual mode interrupt handler;

(d) returning to virtual mode and executing a virtual mode interrupt handler using said stack to provide the same entry conditions as if the interrupt had been in real mode.

25. A method according to claim 24 wherein said new stack contains said current state of said task.

26. A computer system comprising:

(a) a CPU having an address range of greater than 1-Mbyte;

(b) a memory having a continuous physical address range of greater than 1-Mbyte;

(c) addressing means connecting said CPU to said memory; said addressing means including a virtual address mode wherein addresses generated within said CPU are translated to physical addresses used to accress said memory using table entries, said table entries in said virtual address mode including protection bits providing a plurality of levels of protection;

(d) an operating system for said CPU stored in said memory and defining a user memory area and a system memory area in address range of no more than 1-Mbyte;

(e) a task stored in said memory for execution using said operating system in said virtual address mode at a predefined level of low protection;

(f) and means for detecting hardware interrupts occurring when executing said task and creating a stack containing the state of said task at a level of greater protection than said predefined level, then defining a new stack at said level of greater protection to reflect entry conditions which would have existed had the interrupt been entered at said level of low protection and handling the interrupt using said new stack.

27. A system according to claim 26 wherein said level of greater protection is the level of greatest protection and said predefined level of low protection is the level of least protection.

28. A computer system comprising:
    (a) a CPU having an address range of greater than about 1-Mbyte;
    (b) a memory having a continuous physical address range of greater than about 1-Mbyte;
    (c) addressing means connecting said CPU to said memory; said addressing means including a real address mode wherein addresses generated in said CPU are directly used as the physical addressees to access said memory, and including a virtual address mode wherein addresses generated within said CPU are translated to physical addresses used to access said memory using table entries, said table entries in said virtual address mode including protection bits providing a plurality of levels of protection;
    (d) an operating system for said CPU stored in said memory and defining a user memory and a system memory area in an address range of no more than about 1-Mbyte whereby a task stored in said memory for execution uses said operating system in said virtual address mode at a predefined level of low protection;
    (e) and means for trapping input/output instructions when a task is being executed in said virtual address mode at said predefined level of low protection using said operating system, said means for trapping including means for detecting the execution of an input/output instruction and interrupting the execution thereof to instead execute fault-handler instructions at a level of protection greater than said predefined level.

29. A system according to claim 28 wherein said input/output instructions are selectively trapped on the basis of the input/output address referenced by the instruction being executed.

30. A system according to claim 28 wherein said level of protection greater than said predefined level is the greatest level of protection.

31. A method of operating an MS-DOS computer system having a memory address space and an extended-memory address space, wherein said extended memory address space is the address space outside the memory address space which MS-DOS system can access, said method comprising the steps of:
    (a) detecting an instruction to access an expanded memory address space;
    (b) accessing said extended memory address space in lieu of carrying out said instruction.

* * * * *

UNITED STATES PATENT AND TRADEMARK OFFICE
CERTIFICATE OF CORRECTION

PATENT NO. : 4,926,322

DATED : May 15, 1990

INVENTOR(S) : Gary A. Stimac, William C. Crosswy, Stephen B. Preston and James S. Flannigan It is certified that error appears in the above-identified patent and that said Letters Patent is hereby corrected as shown below:

On the title page, section [73], change the name of the Assignee from --Compag-- to "Compaq".

In column 9, line 26, change --protecion-- to read "protection".

In column 12, line 68, change --wellknown-- to read "well-known".

Column 30, Claim 9, line 49, delete the word --p1-- following the word comprising:

Column 30, Claim 9, line 64, change --memor-- to read "memory".

Column 30, Claim 9, line 65, change -- -Kbyte-- to read "Kbyte".

Signed and Sealed this

Twenty-fifth Day of June, 1991

Attest:

HARRY F. MANBECK, JR

Attesting Officer

Commissioner of Patents and Trademarks